(12) United States Patent
Broderick

(10) Patent No.: US 8,250,973 B2
(45) Date of Patent: Aug. 28, 2012

(54) STEAM PEELING SYSTEM

(75) Inventor: Michael Broderick, County Carlow (IE)

(73) Assignee: Odenberg Engineering Limited (IE)

( * ) Notice: Subject to any disclaimer, the term of this patent is extended or adjusted under 35 U.S.C. 154(b) by 1207 days.

(21) Appl. No.: 11/627,866

(22) Filed: Jan. 26, 2007

(65) Prior Publication Data

US 2007/0119312 A1    May 31, 2007

Related U.S. Application Data

(63) Continuation of application No. 10/297,691, filed as application No. PCT/IE01/00076 on Jun. 5, 2001, now abandoned.

(30) Foreign Application Priority Data

Jun. 6, 2000 (IE) .................................... 2000/0456

(51) Int. Cl.
*A23N 7/02* (2006.01)
*A23L 3/00* (2006.01)

(52) U.S. Cl. ................. 99/348; 99/467; 99/477

(58) Field of Classification Search ............ 99/348, 99/467, 474, 477, 478, 516, 536, 584, 593; 426/481–483
See application file for complete search history.

(56) References Cited

U.S. PATENT DOCUMENTS

| | | | |
|---|---|---|---|
| 3,017,758 A | 1/1962 | Haverstock et al. | |
| 3,292,259 A * | 12/1966 | Lambert et al. | 99/459 |
| 4,064,794 A * | 12/1977 | Kunz | 99/474 |
| 4,091,722 A * | 5/1978 | Kunz | 99/479 |
| 4,188,869 A | 2/1980 | Komen | |
| 4,222,322 A | 9/1980 | Van der Schoot | |
| 4,393,756 A | 7/1983 | Van der Schoot | |
| 4,430,925 A | 2/1984 | Kunz | |
| 4,563,364 A * | 1/1986 | Carmichael et al. | 426/510 |
| 4,566,375 A * | 1/1986 | van der Schoot | 99/348 |
| 4,707,372 A | 11/1987 | Catelli | |
| 5,543,166 A | 8/1996 | Masel et al. | |
| 5,732,615 A * | 3/1998 | Harvey et al. | 99/472 |
| 5,843,507 A * | 12/1998 | Harvey et al. | 426/482 |
| 5,947,015 A | 9/1999 | Laurbak | |
| 6,187,360 B1 | 2/2001 | Zittel | |
| 6,234,066 B1 | 5/2001 | Zittel et al. | |
| 6,305,271 B1 * | 10/2001 | Overbeek | 99/348 |
| 6,834,577 B2 | 12/2004 | Xu | |

FOREIGN PATENT DOCUMENTS

AT        367982      2/2007

(Continued)

*Primary Examiner* — Reginald L Alexander
(74) *Attorney, Agent, or Firm* — Rossi, Kimms & McDowell LLP

(57) ABSTRACT

A steam peeling system has a rotatable pressure vessel (1) for steam treating and peeling product. The vessel is substantially spherical, having an oblong configuration with opposed flattened side surfaces. The pressure vessel has at least one internal lifter (51*a*, 51*b*, 51*c*) for entraining and lifting the product relative to the axis of rotation of the pressure vessel (1) when it is rotated. The pressure vessel also at least one internal region (53) that is closed-off against ingress of steam during product treatment. This region (53) defines a steam saver. The system can include a batcher for delivering the product to be peeled to the vessel. The pressure in the vessel can be released on completion of a peeling operation. Arrangements can be included to minimize release of entrained solid matter or odors in the exhaust steam. A controller minimizes unproductive displacement of the pressure vessel and can control the rotation speed and direction.

27 Claims, 14 Drawing Sheets

FOREIGN PATENT DOCUMENTS

| | | |
|---|---|---|
| FR | 2.213.741 | 9/1974 |
| GB | 1 454 119 | 10/1976 |
| GB | 2 247 829 | 3/1992 |
| GB | 2247829 * | 9/1992 |

* cited by examiner

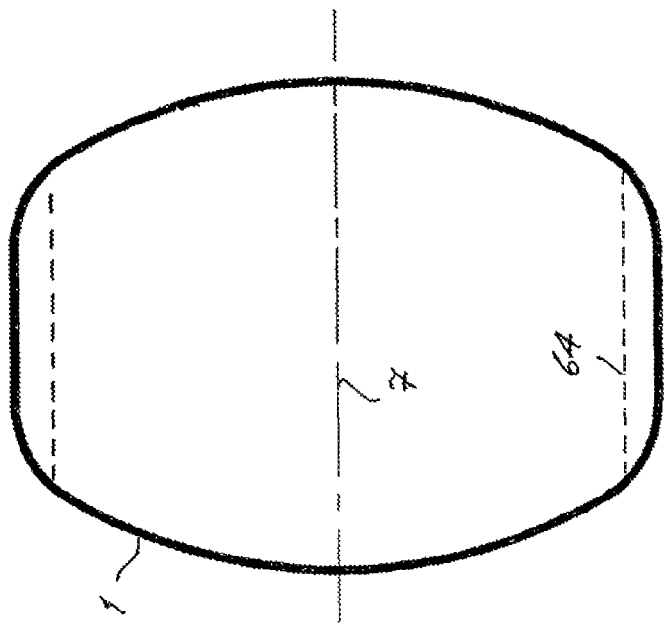
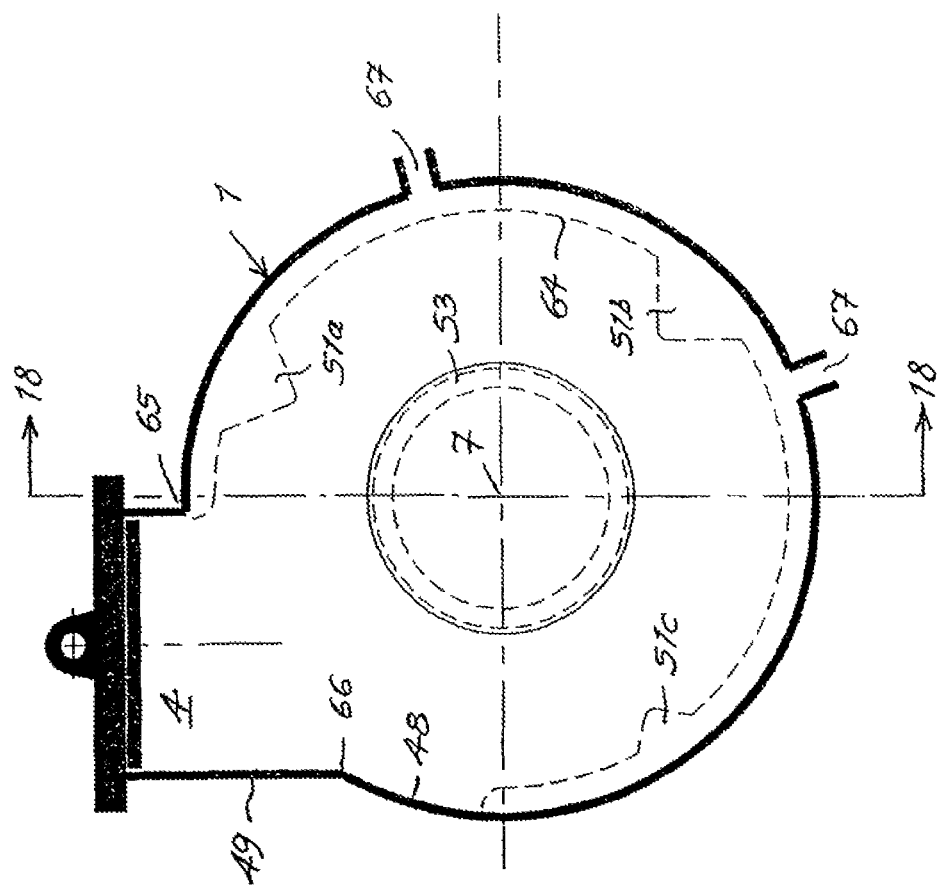
Fig. 18
Fig. 17

STEAM PEELING SYSTEM

This is a continuation of application Ser. No. 10/297,691, which claims priority to PCT/IE01/00076 filed 5 Jun. 2001, which claims priority to application number 2000/0456, filed on 6 Jun. 2000 in Ireland. The disclosure of the priority application, in its entirety, including the drawings, claims, and the specification thereof, is incorporated herein by reference.

BACKGROUND

A first prior art steam peeler is shown in FIG. 1, in an initial product loaded disposition, in which a generally cylindrical pressure vessel 101 is oriented with its axis at an oblique upward angle relative to the horizontal, for loading 102 of product 103 through the mouth 104 of the vessel 101 into an internal cage 119 rotatably mounted within vessel 101. Deaeration is then effected, the pressure vessel 101 is closed, and steam is blown in 105. The pressure vessel 101 is then rotated about an axis perpendicular to the plane of the paper into a disposition in which its axis of symmetry extends substantially horizontally and in the plane of the paper, at which stage the cage 119 is rotated within the vessel 101 about that axis of symmetry to effect the required peeling action while the vessel 101 remains charged with steam under pressure. The pressure within the vessel 101 is then relieved by rapid discharge of the steam, so that the peel is detached from the product, following which pivoting of the pressure vessel 101 about the axis perpendicular to the plane of the paper is again effected, to bring the mouth 104 of the vessel 101 into a downward disposition in which the axis of symmetry of the vessel 101 is oriented at an acute angle with respect to the horizontal, but below the horizontal as compared with the disposition shown in the drawing, at which stage the product 103 is discharged from the pressure vessel 101. The structure is technically complex, because of the diversity of pivoting and rotational movements required, together with the necessity to be able to admit and discharge steam under pressure at various different stages in the sequence of movements, as well as closing the vessel 101 and maintaining it in a sealed condition during the operational cycles.

In FIG. 2, a second form of rotatable steam peeling pressure vessel 201 is shown. In this arrangement, the vessel 201 is rotatable about an axis again perpendicular to the plane of the paper and is initially oriented in a disposition in which its axis of general symmetry 208 is disposed vertically upwards for product charging, 202 through mouth 204, as shown in the drawing. The loading and discharge opening 204 of the pressure vessel 201 is sealed by means of a door 206 which closes from the interior, thereby limiting the extent to which the pressure vessel 201 can be filled with product 203, in that the door 206 closing path of movement must be clear of product 203 during closing and opening movements. During steam peeling, rotation takes place by the pressure vessel 201 being turned about the axis perpendicular to the plane of the paper. By contrast with the arrangement of FIG. 1, rotation of the pressure vessel 201 is provided only about one axis, rather than the two degree of freedom arrangement provided by the structure of FIG. 1. There is no rotation about the axis of symmetry 208 of the pressure vessel 201. On completion of the pressurised steaming period, the vessel 201 is returned to the upright orientation shown in the drawing, pressure is released, and condensate may drain away at the base 211 of the pressure vessel 201 where the product is supported on a grid 213. When pressure is released, the door or inwardly opening lid 206 may also be opened, following which the pressure vessel 201 is inverted or substantially inverted for product 203 discharge. Disadvantages of the arrangement include the necessity for the pressure vessel 201 to be restored to an orientation in an upward direction for opening and closing of the door 206, while also the necessity to provide for drain of condensate arises out of a relatively slow reduction in pressure being applied in the system of FIG. 2, so that condensate forms within the pressure vessel 201, as compared with systems in which rapid flash or high-speed exhaust of the pressurised steam is provided, where formation of condensate within the pressure vessel is substantially minimized.

In the third prior art arrangement in which a rotating pressure vessel is used, as shown in FIG. 3, the pressure vessel 301 is mounted for rotation about a substantially horizontal axis 307 extending in the plane of the paper of the drawing. The pressure vessel 301 is however mounted on this axis 307 in a skewed or canted manner, so that its general axis of symmetry 308 at all times defines an acute angle with respect to the axis 307 of rotation. Charging 302 of the pressure vessel 301 takes place in the manner previously described with the opening 304 of the pressure vessel 301 being upwardly directed, and discharge takes place when the pressure vessel 301 is turned so that the opening 304 is directed downwardly. When the pressure vessel 301 is loaded and sealed by closure of the vessel door, it is charged 305 with steam and is rotated about the horizontal axis 307, but remains in its canted or skewed disposition with respect to this axis 307 at all times. Again in this structure, there is no rotation about the axis of symmetry 308. Because of the canted or skewed arrangement of the pressure vessel 301, the construction is required to tolerate and withstand substantial out of balance forces during rotation of the pressure vessel 301, thereby necessitating a particularly robust and heavy supporting structure. Feed of product to the pressure vessel is effected by means of a weighing conveyor and associated ducting or a hopper arrangement 302, as applies also to the prior art apparatus of FIG. 1 and may likewise be associated with the system of FIG. 2. Exhaust is effected as indicated by reference numerals 314.

FIG. 4 shows a first prior art arrangement using a static pressure vessel 401 which is equipped with a product inlet door 406 at the top 404 and a product outlet door 409 at the bottom 411. Within the static pressure vessel 401, there is provided a continuously rotating agitator 412 and a condensate-separating grid 413. Fixed connections provide for steam supply 405 and exhaust 414 and for condensate discharge 415, all substantially automatically controlled during operation of the system. After filling 402, product 403 to be peeled is held in the compartment 416 above the grid 413, while the agitator 412 keeps the product 403 moving, but without product damage. Separation of condensate, which forms in this system, is continuous throughout the steam exposure time, because of the rotational agitation that is effected about an axis 408 inclined relative to the horizontal. Condensate flows away through the grid 413 and is evacuated by way of a condensate valve 415. At the end of the steaming time, the steam outlet valve 414 is opened for pressure drop to atmospheric. Discharge of product 403 through a door 417 in the grid 413 and subsequently through the product outlet port 411 is then effected. There is downstream transfer of product 403 by auger to a brush and belt skin removal arrangement. The necessity for significant numbers of moving parts within the pressurised region, in particular three doors 406, 409 and 417, together with the need for pressure sealing of at least the drive 418 for the agitator 412 by way of a rotary joint or gland leads to a potentially significant maintenance requirement in a system of this kind, as well as high cost in construction.

A further peeling arrangement using a static pressure vessel is shown in FIG. 5, in which product is charged 502 to a basket 519 which is located within a pressurizable region or dome 516. The basket 519 is shown in FIG. 5 in a discharge or dump orientation and reference 502 indicates the direction of charging or loading when the mouth of the basket 519 is directed upwards. The dome 516 is then sealed and charged with steam, while the basket 519 containing the product is rotated or turned within the dome 516, for exposure of the product to steam and immediate run-off of condensation. At the end of the steaming period, a large steam outlet provides for rapid fall in pressure to optimise bursting of the skin. As will be apparent however from the drawing, the region 516 to be charged with steam is of significantly greater volume, to a multiple degree, than the region 519 of this system actually containing product, so that the system of FIG. 5 is somewhat extravagant in its use of steam, while also the ability to secure rapid or flash blow-off of the steam with substantially instantaneous reduction in pressure is reduced, because of the very great volume of steam to be relieved.

FIG. 6 shows a prior art steam peeling system developed by the present inventor, using a rotating pressure vessel 601 and various associated equipment. The vessel 601 is of generally symmetrical cylindrical form about an axis of symmetry, which extends in the plane of the paper, and the vessel 601 is rotatable about a substantially horizontal axis, which, as shown in the drawing, extends perpendicular to the plane of the paper. Product is brought to the steam peeler vessel 601 by way of an in-feed container and is batched in a hopper unit 602 that supplies product through the pressure vessel 601 door opening or mouth 604 when the vessel 601 is oriented in a generally upward disposition. When the vessel 601 is sealed, rotation takes place about the substantially horizontal axis perpendicular to the plane of the paper, without rotation of the pressure vessel 601 about its axis of symmetry, and at the end of the steaming period, the pressure vessel 601 is relieved such as by valve 614 to a large volume exhaust vessel 621, for so-called "rapid flash" or expedited reduction in steam pressure within the pressure vessel 601, thereby engendering effective bursting of the peel from the surface of the product. Charging of the vessel 601 for the steaming period takes place in substantially known manner such as via valve 605 from a steam accumulator 622. Product is discharged from the pressure vessel 601 in a substantially inverted disposition thereof and is then brought by way of a product transfer auger 623 to a centrifugal separator 624, where peel is removed and discharged to waste, while the peeled product is advanced to further food processing operations as may be required.

This system has proved to be effective and economical, subject to certain disadvantageous aspects, according as understanding of the peeling process and the relevance of certain parameters of the operations carried out during peeling has become further understood.

There still remains a need to overcome the disadvantages of prior art peeling systems, and especially steam peeler pressure vessels, as indicated above. It is particularly desirable to provide an improved steam peeler pressure vessel and also to provide an improved feed arrangement for steam peeling pressure vessels. It is further desirable to provide improved arrangements for steam discharge. It is a still further desirable to provide improved arrangements in a steam peeling system for accelerating pressure relief. It is still further desirable to further improve the steam peeler by improving the manner of exhausting steam to atmosphere in a steam peeling system. The present invention addresses the above needs.

SUMMARY OF THE INVENTION

The present invention relates to a steam peeling system. The system can include a rotatable pressure vessel that is rotatable about an axis of rotation and an opening for loading the vessel with product to be peeled and discharging the product from the vessel. The product is receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly.

The vessel includes a door for sealing the opening of the pressure vessel between an open disposition, in which the door is located within the container, and a sealed disposition in which the door is urged into engagement within the opening of the pressure vessel from the interior of the vessel. The door can be hingedly mounted on the pressure vessel and pivotable between the open and sealed dispositions.

The system can further include a mechanism for displacing the door located entirely externally of the pressure vessel so that the enclosed interior region of the pressure vessel defines an internal void space around the door in the sealed disposition that is a substantially smooth continuation of the internal surface of the pressure vessel throughout the region of the opening.

The system includes means for introducing pressurized steam into the pressure vessel while the pressure vessel is loaded with the product to be peeled and means for fully rotating, i.e., 360°, the pressure vessel about the axis of rotation of the pressure vessel for a steam treatment of the product.

The pressure vessel includes a plurality of lifters inside the pressure vessel for entraining and lifting the product about the axis of rotation of the pressure vessel during rotation of the pressure vessel. Each of the lifters protrudes substantially radially inwardly from a region of an interior wall surface of the pressure vessel and is configured to assist lifting and mixing of the product to be peeled to enable steam to access each individual product and can be configured to minimize damage to the product.

Each of the lifters can be defined by an upstanding portion of a false floor that is spaced from an interior wall surface of the pressure vessel. At least a portion of the false floor can be apertured for passage of condensate through the apertures of the false floor, so that condensate can be accumulated in the region between the false floor and the interior wall surface of the pressure vessel. At least a portion of the false floor is non-apertured to provide a region for at least temporary retention of condensate accumulation during rotation of the vessel. The system can further include means for enabling removal of condensate from the region between the false floor and the interior wall surface of the pressure vessel.

Each of the lifters can define a closed region that is not in communication with the remainder of the interior space within the pressure vessel for the movement of gas or vapor between the closed region and the remainder of the interior space within the pressure vessel.

At least one internal region that is closed-off against ingress of steam during product treatment can be provided. The at least one internal region defines a steam saver. The at least one internal region can be defined within an enclosure, all portions of which are spaced apart from any interior wall surface of the pressure vessel. The at least one internal region can be defined by at least one of the lifters. The at least one internal region can be provided on the side of the door of the pressure vessel, which side is directed toward the interior of the vessel. The at least one internal region can be provided with an enclosure located on a wall portion of the vessel in the vicinity of the axis of rotation of the vessel, which axis lies substantially along an axis of symmetry of the vessel. A multiplicity of internal regions, i.e., stem savers, of diverse constructions thus can be provided within the pressure vessel. Thus lifter-defined savers can be present along with a door-mounted saver or a wall-mounted enclosure type saver or both.

The system can include a controller for controlling rotation of the pressure vessel. The controller also can vary the rotational speed of the pressure vessel during the steam treatment. The controller can reverse the direction of rotation of the pressure vessel during the steam treatment. The direction of rotation during discharge of the product from the pressure vessel can be opposite to the direction of initial rotation of the pressure vessel immediately following the loading of the product. The controller can control the door opening and closing while the vessel is rotating. The controller can control the door so that the product can be discharged from the pressure vessel while the vessel is rotating.

The pressure vessel can be substantially sphere shaped with opposed flattened side surfaces. The vessel can be defined at least in part by two opposed dish-shaped portions having rim regions engaged, such as by welding, together to define an enclosed interior region. The vessel can be elongates so that an aspect ratio between a maximum length of the pressure vessel and a width of the pressure vessel between the opposed flattened side surfaces is between about 1.2:1 and about 2:1. The vessel can be substantially symmetrical at least about the axis of rotation of the vessel, which axis extends between the opposed flattened side surfaces of the pressure vessel.

The system can further include means for substantially instantaneously reducing the pressure in the pressure vessel. Such means can comprise a port for discharging pressurized steam. The ratio between the volume of the pressure vessel in liters and the area of the port in square inches can be in the range 10:1 to 20:1, the ratio of about 14:1 being preferable. Steam entry and exhaust can take place through the port.

The system can further include an expansion chamber for receiving pressurized steam discharged from the pressure vessel, and means for releasing the pressurized steam from the pressure vessel into the expansion chamber. The pressurized steam releasing means can be located substantially at the point of entry of steam into the expansion vessel. The cross-sectional flow area of the pressurized steam releasing means can increase progressively from an inlet region thereof to a discharge region thereof. The pressurized steam releasing means can comprise a valve.

The system can also include means for releasing steam or vapor or both from the expansion chamber to atmosphere. Such means can include an arrangement for substantially minimizing release of entrained solid matter or odors or both in steam or vapor or both leaving the expansion chamber. A baffle can be located within the expansion chamber and a solids trap can be located substantially at the exit location from a stack communicating between the interior of the expansion chamber and atmosphere. Alternatively, the solids trap can be located in the interior of the expansion chamber.

The system can further including a rotary batching unit for cooperation with the pressure vessel. The rotary batching unit can have a plurality of compartments arranged for advancing movement within an enclosing housing, for selective successive alignment of each compartment with a product loading location and subsequent alignment of the compartment with a location for discharge of the product to the pressure vessel. Each compartment of the batching unit can be suitably defined between radially spaced apart and radially extending blades of vanes mounted for rotation about a common axis. The batching unit also can be mounted by way of weighing means, for example a plurality of load cells, for computation of the weight of the product accommodated by the batching unit.

BRIEF DESCRIPTION OF THE DRAWINGS

The invention will now be described with reference to the accompanying drawings, of which FIGS. 17-21 illustrate alternative embodiments of the peeler vessel thereof.

FIG. 1 shows a first prior art arrangement of rotating pressure vessel for steam peeling food products.

FIG. 2 shows a second prior art arrangement of rotatable pressure vessel for steam peeling food products.

FIG. 3 shows a third prior art arrangement of rotatable pressure vessel for steam peeling food products.

FIG. 4 shows a first prior art arrangement for steam peeling food product in which a static pressure vessel is used.

FIG. 5 shows a second prior art arrangement for steam peeling food product in which a static pressure vessel is used.

FIG. 6 shows a further prior art steam peeling system in which a rotatable pressure vessel is used.

FIG. 7 illustrates a side view of a steam peeling system according to the present invention.

FIG. 8 illustrates an end view of the system from the righthand side of FIG. 7.

FIG. 9 is a top or plan view of the system of FIG. 7.

FIGS. 10 and 11 illustrate a steam peeling pressure vessel and a feed hopper of the system, in a first stage and a second stage, respectively, of a feed or loading operation.

FIG. 12 illustrates a central sectional side view of the steam peeling pressure vessel, showing internal features of the vessel.

FIG. 13 is a sectional view of the vessel taken along line 13-13 of FIG. 12.

FIG. 14 is a top or plan view of the vessel of FIG. 12.

FIG. 15 illustrates rotary drive and steam feed and exhaust arrangements of the system of FIG. 7.

FIG. 16 illustrates a rotational program diagram for one complete steam peeling cycle for a steam peeling pressure vessel.

FIG. 17 is similar to the vessel of FIG. 12, but includes an in-vessel condensate removal feature of the steam peeler vessel.

FIG. 18 is a sectional view taken along line 18-18 of FIG. 17, but with omission of certain features.

FIG. 19 illustrates another embodiment of the vessel of FIG. 17, namely a variant of the in-vessel condensate removal feature of FIG. 17.

FIG. 20 illustrates a side sectional view of a known steam peeler vessel configuration fitted with the condensate separation features and product lifting or mixing features according to the present invention.

FIG. 21 is a top view of the vessel taken along line 21-21 of FIG. 20, again with omission of selected features not essential to understanding the invention.

FIG. 22 illustrates an exhaust arrangement, including features for encouraging accelerated pressure drop in an expansion chamber.

FIG. 23 illustrates an arrangement for solids entrainment in the exhaust features.

DETAILED DESCRIPTION

Figure 9:
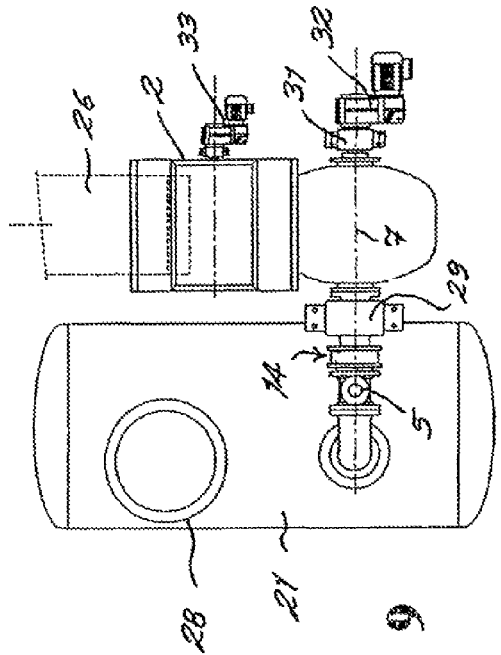
FIGS. 7-16 illustrate a peeler vessel system according to the present invention.
Figure 8:
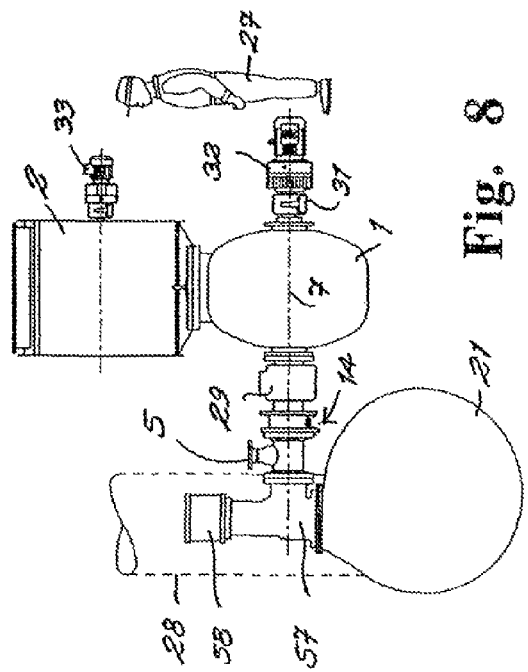
Figure 7:
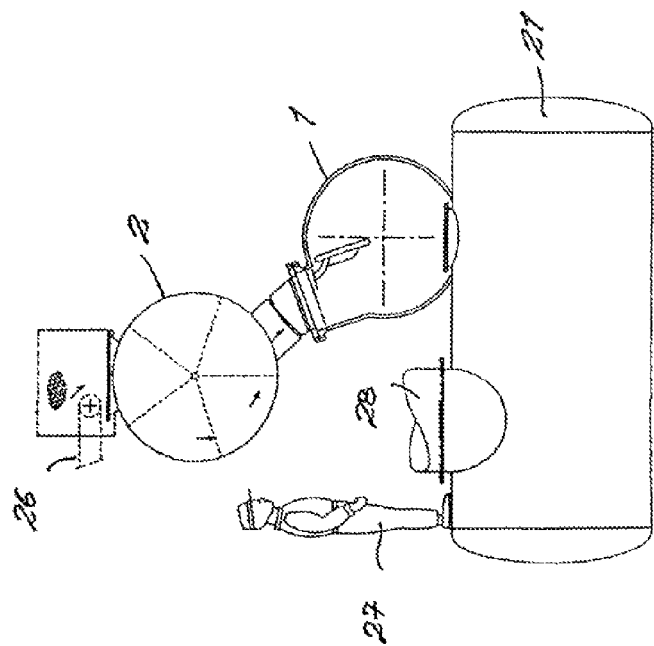

Referring now to FIGS. 7-9, there is shown a steam peeling system according to the present invention, incorporating a steam peeling pressure vessel 1 and including also other features. As shown in the side view of FIG. 7, the steam peeling vessel 1 is mounted for rotation about an axis 7 which extend substantially horizontally and perpendicular to the plane of the paper. The pressure vessel 1 is supported for rotation on a structure also providing operator access to the system, whenever required. Infeed to the pressure vessel 1 is provided by a conveyor belt 26 to a rotary batching unit 2, by which product is transferred from the infeed belt 26 to the pressure vessel 1 in measured quantities, as subsequently described. The representation of the human FIG. 27 in FIGS. 7 and 8 is intended to indicate the scale of the system in an exemplary embodiment.

Referring now in particular to FIG. 8, the relative dispositions of the batching unit 2 and the pressure vessel 1 are again shown, together with the relationship between the pressure vessel 1 and an expansion chamber or vessel 21, which is located to the rear of and below the pressure vessel 1 in terms of FIG. 7. As indicated in FIGS. 8 and 9, a large diameter stack 28 extends from the expansion chamber to a discharge location (not shown in these drawings) for waste or exhaust steam, the arrangement in this regard to be described below. The expansion chamber 21 is provided with special fast condensing facilities, again as subsequently described. The compact arrangement of the various units of the system may be noted, the assembled system defining an especially cohesive package occupying a reduced spatial volume as compared with prior art arrangements.

Referring finally to the top view of FIG. 9, the relative dispositions of these various features will be again apparent, and in particular, as also shown in FIG. 8, the locations of the bearings 29, 31 for the rotary pressure vessel 1 and also the disposition of the steam line 14 between vessel 1 and expansion chamber 21 are particularly apparent. Also shown in FIGS. 8 and 9, and not illustrated in subsequent drawings, are drive motor and drive gear arrangements 32 and 33 respectively for vessel 1 and batching unit 2 respectively.

As compared with prior art peelers, the pressure vessel 1 is particularly suited to being embodied in units of dimensions suited to the treatment of lesser volumes of product than in the prior art. However, despite a reduced pressure vessel capacity system, throughput is not reduced, because of an accelerated cycle time and particularly efficient use of all stages of the cycle, as will be subsequently explained.

Figure 11:
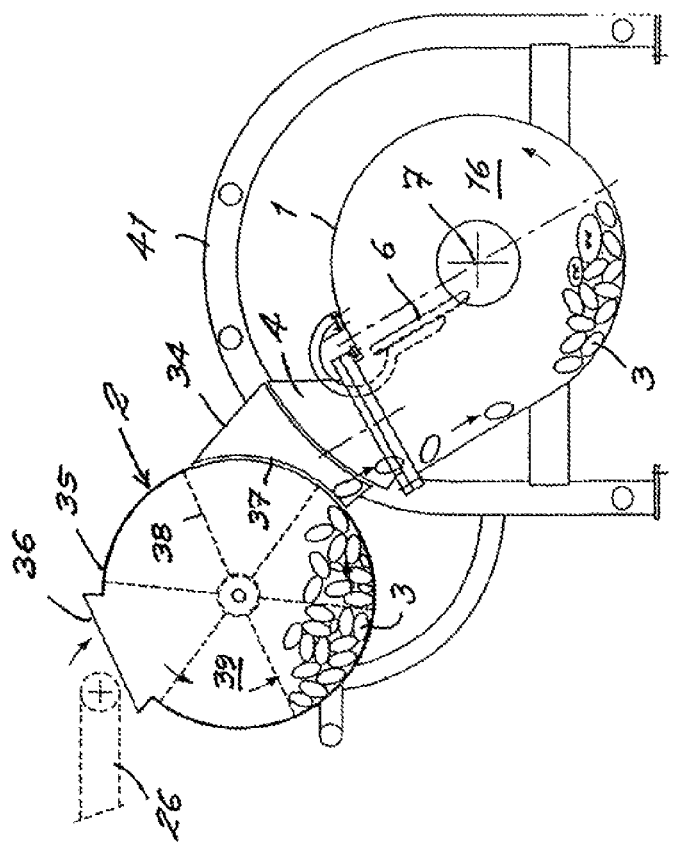
Figure 10:
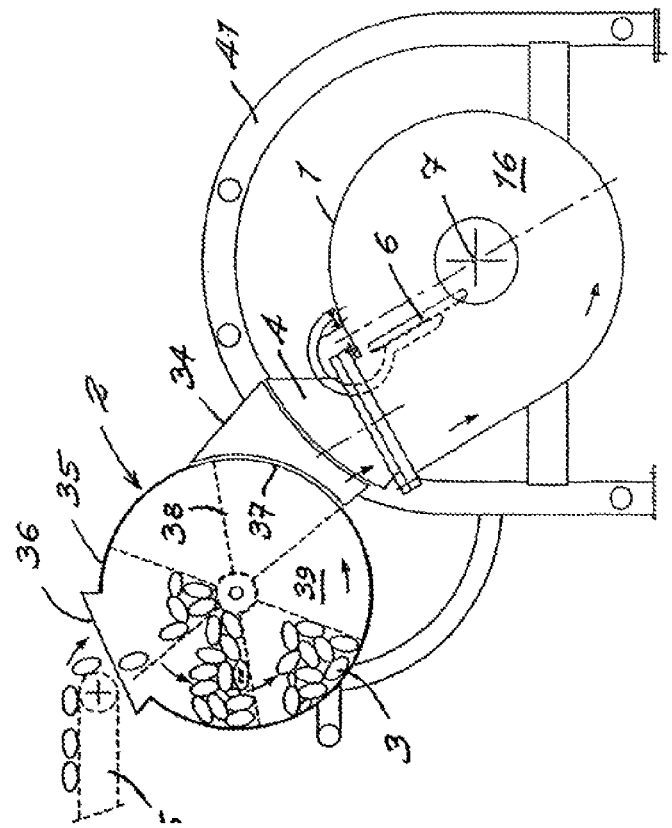

FIGS. 10 and 11 show, in their loading dispositions, the rotary pressure vessel 1 and the cooperating rotary batching unit 2, which takes the form of a rotary batch hopper. As shown in FIG. 10, the pressure vessel 1 is rotated about its axis of rotation 7 into a disposition in which the charging and discharging opening or mouth 4 is directed upwardly at an angle. The door 6, which closes from the interior, is at this time also in an open disposition. In this orientation, the pressure vessel 1 is aligned with ducting features 34 facilitating product movement from the rotary batch hopper 2 into the pressure vessel 1.

The rotary batch hopper 2 comprises a substantially cylindrical drum 35, which is stationary, and has inlet 36 and outlet 37 ports. The inlet port 36 is located underneath the delivery end of the product conveyor 4, while the outlet port 37 is aligned with the ducting features 34 through which product 3 may move from the rotary batch hopper 2 into the pressure vessel 1. Within the rotary batch hopper 2, there are provided a number, preferably six, of vanes or blades 38, together defining a structure somewhat similar to a paddle wheel. The vanes or blades 38 rotate as a single integral unit within the static cylindrical shell 35 of the rotary batch hopper 2 and thereby define a series of moving compartments 39. Product 3 falling from the conveyor 26 enters into the particular compartment 39 which is currently aligned with and stationary at or moving past the inlet port 36 of the hopper 2. Indexing may be used in operation of the batcher 2 for loading alignment of compartments 39 by intermittent advance of the blades or vanes 38. As the blade 38 defining the trailing edge of the space 39 in question moves away from the inlet port 36, the particular segment 39 of the rotary batch hopper 2 which is now charged with product 3 to a substantially predetermined extent is closed off against entry of further product 3 and continued rotation of the blades 38 brings this compartment 39 into traversing alignment with the ducting 34 giving admission to the peeling vessel 1, where product 3 falls from the compartment 39 into the pressure vessel 1, as shown in FIG. 11.

The delivery from the conveyor 26 and the advancing rotary movement of the vanes 38 of the batch hopper 2 may be coordinated and linked for intermittent advance in a manner suitable to load substantially measured quantities of product 3 into the pressure vessel 1. In a preferred arrangement, the batch hopper 2 is used to load four segments 39 of product 3 into the pressure vessel 1, for a high capacity load. A low capacity peel is also possible, in which the contents of the batch hopper 2 to be transferred to the peeler 1 are contained in just two or three segments 39 of the hopper 2. It will be apparent that still further arrangements may be provided, in which different numbers of segments 39 are used for product 3 loading, or hoppers 2 with different numbers of blades 38 are provided, as for example, the five-bladed variant illustrated schematically in FIG. 7.

The rotary batching unit 2 as described and shown with respect to FIGS. 10 and 11 also provides for product weighing. Thus the batcher 2 is also used to weigh product 3 being fed to the pressure vessel 1. For this purpose, the batcher is suitably mounted on three load cells and the weight of product accommodated within the unit may be evaluated continuously. The weight of product discharged and/or received may then be completed by suitable coordination between the weighing operation and vane displacement. In this way, the weight of product in any compartment of the batcher may be determined.

The unit 2 has multiple advantages, in that it is particularly simple, having just two bearings and being drivable by a relatively small motor 33 (FIG. 9). There is a gentle fill from the infeed elevator or conveyor 26 to the batching unit 2, the drop height being low, in a preferred embodiment less than 600 mm, although greater drops may be employed without product 3 being damaged. The manner of movement of product 3 within the unit 2 from when it is loaded into the batcher 2 to when it is discharged to the peeler 1 also substantially precludes product 3 damage at this stage also. There is thus likewise a gentle fill from the batching unit 2 itself into the pressure vessel 1. The batcher 2 may be described as operating as a kind of "lowerator" for the product 3. This gentle fill or "lowerating" effect may be achieved at both high and low capacity batch loads. The method of loading reduces possible product 3 damage during transfer of product 3 from infeed conveyor 26 to the pressure vessel 1.

The unit 2 requires low maintenance and provides high reliability, in that there are no belts or rollers, and no sliding door, such as exists in known batching units. Weighing may be effected by load cells. The unit 2 is particularly easy to fill into from the infeed conveyor 26, even when a wide unit 2 and a wide conveyor 26 are used. No cut-outs are required in the hopper 2. The construction is such that product 3 cannot bridge, in that there is no taper in the directions of either loading or discharge. The unit 2 facilitates the handling of small batches, by virtue of the segmented 39 construction. The unit 2 may be readily manufactured and is of low cost, even when manufactured in stainless steel. It further enables the overall height of the steam peeling system to be significantly reduced, while allowing venting of the cladding for the steam region. The use of a rotary batching unit 2 of this type in steam peeling, together with associated weighing and feeding, represents one novel aspect of the present system, and one providing a uniquely attractive visual and technological ambience to the system. FIGS. 10 and 11 also indicate in part certain structural supporting features 41 relating to the mounting of the pressure vessel 1.

Figure 14:
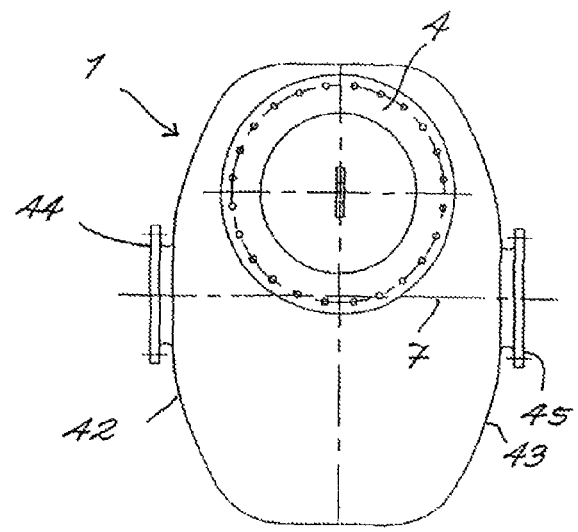
Figure 12:
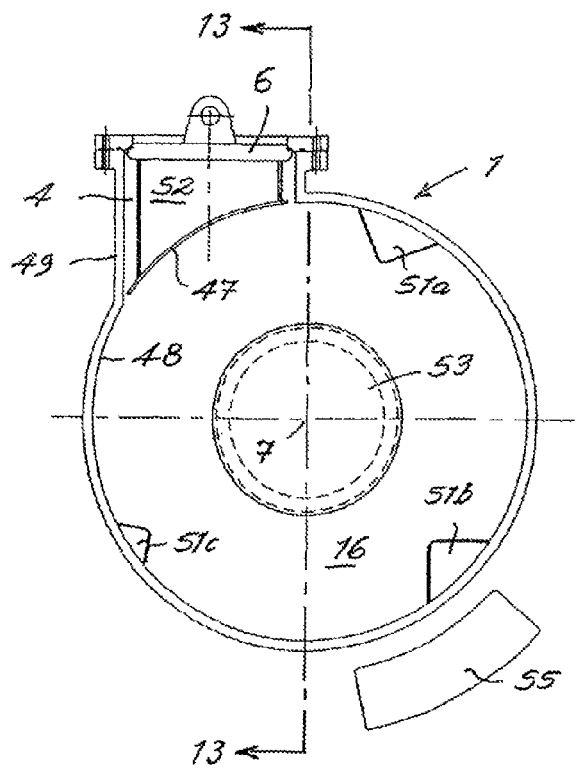
Figure 13:
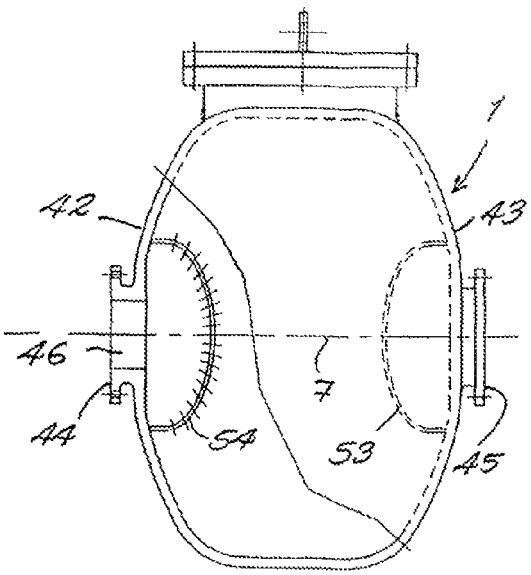

Referring now to FIGS. 12-14, these show structural and internal details of the pressure vessel 1. A simple shell structure of the general shape of a solid doughnut, namely one without a central aperture, is used. In other words, in this embodiment, the structure 1 resembles a sphere with squashed-in sides, 42, 43, but a wide diversity of other shapes and constructions may be applied. The structure 1 is rotatable about an axis 7 extending between the two somewhat flattened sides. The simplicity of the structure is particularly advantageous for construction as a shell. The pressure vessel 1 can be assembled from two dished portions, for example, ellipsoidal dished ends, welded together along their rims.

It is important to emphasise that the reference to "a sphere" in describing the shape of the pressure vessel 1 is for the purposes of such description only and the pressure vessel 1 in no way equates to a wholly spherical pressure vessel as known in the prior art. Thus in referring to the vessel 1 as being in the shape of a solid doughnut, what is in question is a so called jam doughnut, rather than a doughnut with a central aperture passing through it. As noted, the vessel 1 can be formed from two dished shells, fixed together such as by welding along their rims. An ellipsoidal cross section may suitably be used for each shell, but this shape is not an essential aspect of the vessel 1. The vessel 1 is to be distinguished from any fully spherical unit of the prior art by its aspect ratio, namely the ratio of the maximum diameter of the pressure vessel 1 to its width, this latter being defined as its wall to wall dimension substantially along its axis of rotation 7, i.e., between walls 42 and 43. For a sphere, as in the known pressure vessel, the aspect ratio is 1:1, whereas in the vessel 1, the aspect ratio is in the range from 1.2:1 upwards, e.g., in a typical construction of the order of about 2:1. Thus the overall shape of the unit 1 is somewhat similar to that of a low aspect type as applied in modern high performance motor vehicles.

As shown in the drawings, bearing mountings 44, 45 are provided on the flat side faces 42, 43 of the pressure vessel 1, and one 44 of these bearing mountings 44, 45 is provided with a single opening or port 46 for steam discharge, as subsequently described and discussed. On the top of the unit 1, in the orientation shown in the drawings, there is provided the peeler vessel product 3 inlet port or mouth 4, which is closed off by an inwardly pivotable door 6. The door 6 may be provided on its underside with a surface portion 47, which defines, in the closed condition of the door 6, a substantially smooth continuation of the internal surface 48 of the pressure vessel 1 throughout the door 6 region. An arrangement of this kind serves to prevent product 3 from becoming trapped in any constricted regions of the interior of the pressure vessel 1 during pressure vessel 1 rotation, but does not represent an essential feature of the invention.

The smoothing 47 of the internal profile 48 by a door infill of this nature may also be advantageous to avoid possible engagement of product 3 by the ducting 49 in the door 6 region during rotation at higher speeds with any potential product 3 throwing situation being thereby avoided. However, within the normal speed range applicable to the present system, such a situation does not in the normal way arise and in-filling of the door 6 region represents an optional feature only.

The internal shape of the vessel 1 is also adapted to assist in lifting product 3 held within the vessel 1 during rotation, to ensure constant product 3 movement during vessel 1 rotation. Such lifting/mixing action enables more uniform peeling to be achieved, due to more uniform application of steam to the product 3. Lifting features 51a, 51b and 51c within the vessel 1 are shown in the drawing, in the form of inward protrusions from vessel internal surface 48. Lifting features 51a, 51b, 51c of this kind may also be defined or referred to as paddle lifters, and a multiplicity of such features may be used, for example three in an exemplary embodiment as shown in FIG. 12. This feature is of particular significance and advantage and is further described below.

The pressure vessel 1 also incorporates steam savers. Steam savers consist of fillers within the vessel 1 which cut down the amount of free space inside it, thus saving steam and optionally also advancing the mixing action. In a pressure vessel 1 of a particular nominal capacity, a volume significantly less than the nominal capacity would suffice to accommodate product 3 during steam peeling. While a larger volume is needed to ensure mixing, steam savers are used to fine-tune the volume requirement and reduce the unnecessary or wasted space to the minimum required to enable mixing. One such steam saver 51a, which also defines a lifter, is shown adjacent to the door 6 and to the right of the door 6 in FIG. 12. This provides a projecting enclosed region 51a extending into the internal space 16 of the pressure vessel 1 from the wall 48 thereof. The steam saver 51a thus represents or defines a sealed-off region of the interior of the pressure vessel 1, into which steam cannot penetrate, and neither, of course, can product 3.

A further steam saver 52 is provided on the rear face of the door 6 itself, in that the region between the outer panel of the door 6 and the inner curved portion or panel 47 which matches the internal surface 48 of the pressure vessel 1 is also sealed against steam entry. In addition, the further mixing bars or lifting paddles 51b and 51c may also constitute small steam savers, either in the structural form as shown in FIG. 12 or alternatively in the form of closed-off or sealed cylinders mounted on the inner wall 48 of the vessel 1, while a still further steam saver 53 is provided by an additional encroachment or closed-off domed region overlying the non-steam passage-provided bearing mounting 45 of the pressure vessel 1, namely that on the righthand side as it appears in FIGS. 13 and 14. At the lefthand bearing mounting 44 as shown in FIG. 13, i.e., that bearing mounting which is provided with the steam entry and exit passage 46, a perforated head or baffle 54 located in the interior 16 of the vessel 1 and covering over the entry to the steam port 46 from the vessel 1 interior 16 allows entry and exit of steam, but not the passage of product 3. Thus, product 3 to be peeled, which is held within the vessel 1, cannot reach the steam feed and discharge duct 14.

Steam savers are seen as a particularly advantageous feature, in that not only do they reduce the cost of steam supply but they also enhance exhaust time, because there is less steam to be exhausted. In a particular construction, two small lifters 51a, 51b, 51c serving also as steam savers and one large filler 52 or 53 may be provided, the large filler being selected from one or other of the options 52 or 53 shown in the drawings, although provision of multiple lifters 51a, 51b, 51c also doubling as steam savers is not precluded. In a further variant, up to six lifters may find application, one or more also optionally defined by steam saver features of the structure.

It may be emphasised that any region of the vessel 1 that is not used for the treatment of product 3 can be employed as a steam saver. Thus, in addition to the various examples of steam savers shown in the previous drawings, a further steam saver can be provided across the center of the vessel 1, being defined by a closed drum extending transversely across the vessel 1 and in coaxial surrounding alignment with the axis of rotation 7 of the vessel 1. In a still further variant, a closed-off, substantially spherical region defining a steam saver may be defined in this part of the pressure vessel. The deployment of unused regions of the vessel 1 for steam savers is additional to savers defined by lifters 51a, 51b, 51c, which, by contrast, are deployed within active or operative regions of the vessel 1.

Thus, each of these steam savers may define a lifting member or bar 51a, 51b, 51c, although, as already mentioned, lifters 51a, 51b, 51c may also be defined independently of steam savers. Lifters 51a, 51b, 51c may be applied not only to pressure vessels 1 of the present novel configuration but also in peeling vessels of known configuration. Likewise, steam savers may be applied in peeling vessels of known construction, either in combination with lifters and, at least in part, defining lifters, or entirely independently of any provision of lifters.

Experimental investigations have shown that in the absence of lifters 51a, 51b, 51c, there is a tendency for product 3 to remain static at the base of the vessel 1 during rotation, the aggregate of product 3 within the vessel 1 behaving somewhat similarly to liquid or sand in such circumstances. In a particular arrangement, illustrated in FIG. 12, each lifter 51a, 51b, 51c is defined by a generally L-shaped, right-angled plate portion, shaped on the outer edges of each angle member to fit the curved internal profile 48 of the steamer vessel 1 and placed in position with the 90° angle directed inwards, the angle plate edges being welded to vessel wall 48. Thus, steam saving regions are thereby also defined in the interior of each lifter 51a, 51b, 51c. As shown in the drawings of the present application, three sizes of lifter 51a, 51b and 51c may be used, and they may be spaced apart at substantially 120° intervals around the internal periphery 48 of the vessel 1, with the largest lifter 51a being closest to the filling opening 4 and located on that side of the filling opening 4 where the duct portion 49 communicating between the vessel 1 mouth 4 and the interior 16 of the vessel 1 has the shortest axial dimension. Moving away from this shorter axial dimension side of the entry region 4, the lifters 51a, 51b, 51c are then in succession respectively large, medium and small in the peripheral or circumferential direction of the vessel, i.e., clockwise in FIG. 12.

The provision of steam savers 51a, 51b, 51c, 52, 53 enables precise computation or calculation of the saving in steam to be achieved in the present system, as compared with prior art steam peeling arrangements. Minimization of the quantity of steam required by the system during product treatment also assists in speeding up exhaust, in that there is a lesser amount of steam to be discharged during the exhaust phase. Steam savers 51a, 51b, 51c, 52, 53 may be dimensioned and selected such that the effective operating volume of a pressure vessel 1 in a particular installation may be varied, within a substantially standard external shell. Furthermore, as described above, steam savers 51a, 51b, 51c, 52, 53 may be provided within the pressure vessel 1 to be of dimensions and configurations such as will assist in mixing and agitation of product 3 to be treated.

Another feature is shown in FIG. 12, in the form of a door weight counterbalance 55 provided to improve the speed capability of the vessel 1 in rotation, namely the ability of the pressure vessel 1 to rotate at a faster rate. Thus, the unique and novel pressure vessel 1 shape combined with its other features establish a potential for high speed operation, with the steaming action within the vessel 1 being further enhanced by the provision of the mixing lifters or paddles 51a, 51b and 51c according to the invention. In a practical installation, counterweight 55, showed spaced from the vessel 1 outer wall, is actually mounted on the vessel 1.

Figure 15:
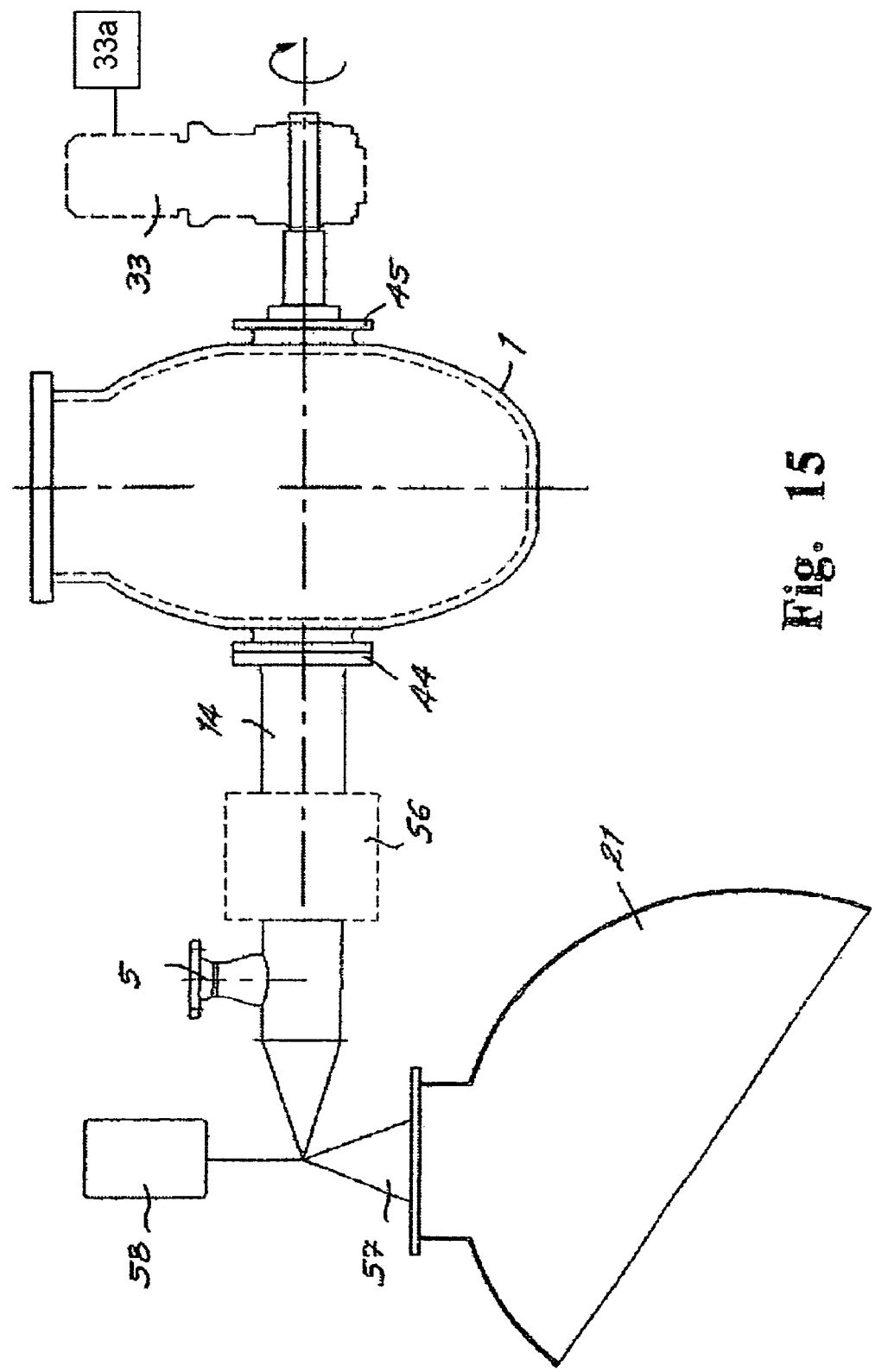

Moving now to FIG. 15, the pressure vessel 1 rotating mounting and steam discharge arrangements are shown. On the righthand side of the pressure vessel 1, drive 33 is effected at the righthand bearing mounting 45 and bearing 31 (FIGS. 8 and 9) as shown in the drawing. On the lefthand side of the drawing, steam entry and exit is effected through the lefthand bearing mounting 44 and bearing 29 (FIGS. 8 and 9). Communication between the interior 16 of the pressure vessel 1 and the steam charging and discharge line 14 is effected through a rotary gland 56 with suitable packing. Thus steam admission and steam discharge takes place through a single steam port. There is only one port in the system, and this port serves alternately as an inlet port and an exhaust port. Steam is fed into the pressure vessel 1 through a charging line, not shown in the drawing, by way of a suitable valve arrangement 5. Beyond the charging connection 5, the steam passage 14 from the pressure vessel 1 terminates at an expansion valve 57, which is mounted directly at and suitably on top of the expansion chamber 21 and defines a steam pressure release means of the system. The valve 57 geometry provides for an inlet diameter of substantially 10 inches and an outlet diameter of 12 inches, so that expansion of steam being conducted through the valve 57 takes place in part through and within the actual body of the valve 57. The increase in area from valve inlet to valve outlet is thus of the order of 40%. The arrangement provides a spatial saving and may also be associated with a reduction in noise and flow turbulence at the point of entry into the expansion chamber 21, as well as a reduction in the number of components in the system and less back pressure. The valve 57 is suitably driven by a motor 58.

The 10 inch inlet diameter to the expansion valve 57 together with the provision of a comparable diameter and exhaust flow area at the single exhaust port 46 of vessel 1 represents a very substantial increase in pressure vessel 1 exhaust port 46 diameter and area as compared with the maximum values currently in use, at least in single port steam peeler pressure vessel arrangements, where exhaust port diameters are typically in the range of 7 to 8 inches. As already noted, exhaust port 46 defines a single port for the pressure vessel and also serves as the steam admission or inlet port. Thus there is, in the system as embodied in the present drawing, a single entry port and a single exit port. As a result of this increase in pressure vessel 1 exhaust port 46 size, together with the use of an expansion valve 57 mounted at and on the expansion or blowdown chamber 21, a significantly reduced ratio of peeling pressure vessel 1 volume to exhaust port 46 area applies in the present system. Specifically, the ratio between vessel 1 volume in liters and port 46 area in square inches is typically as set forth in Table 1.

TABLE 1

| | PRESSURE VESSEL VOLUME (LITERS) | PORT AREA (SQ. INCHES) | RATIO (VOLUME:AREA) |
|---|---|---|---|
| PRIOR ART | 1400 | 50.2 | 27.9:1 |
| PRESENT INVENTION | 1000 | 78.55 | 12.7:1 |
| | 1100 | 78.55 | 14.1:1 |
| | 1200 | 78.55 | 15.2:1 |

The ratio may also be expressed between vessel 1 volume and port 46 diameter, resulting in the following figures as set forth in Table 2.

TABLE 2

| | PRESSURE VESSEL VOLUME (LITERS) | PORT AREA (SQ. INCHES) | RATIO (VOLUME:DIAMETER) |
|---|---|---|---|
| PRIOR ART | 1400 | 8 | 175:1 |
| PRESENT INVENTION | 1100 | 10 | 110:1 |

The preferred ratio of vessel 1 volume to discharge line 14 diameter facilitates optimization of the bearing 29 (FIGS. 8 and 9) surrounding the discharge line 14 between the vessel 1 and the steam gland 56 and steam valve 5 region. This bearing 29 is exposed to particularly difficult operating conditions and the system parameters provided by the invention facilitate substantially optimised bearing 29 selection. It will be appreciated that the enhanced steam line 14 diameter and area prevails throughout line 14 from exhaust port 46 through to the comparably sized or dimensioned inlet to expansion valve 57.

Figure 1:
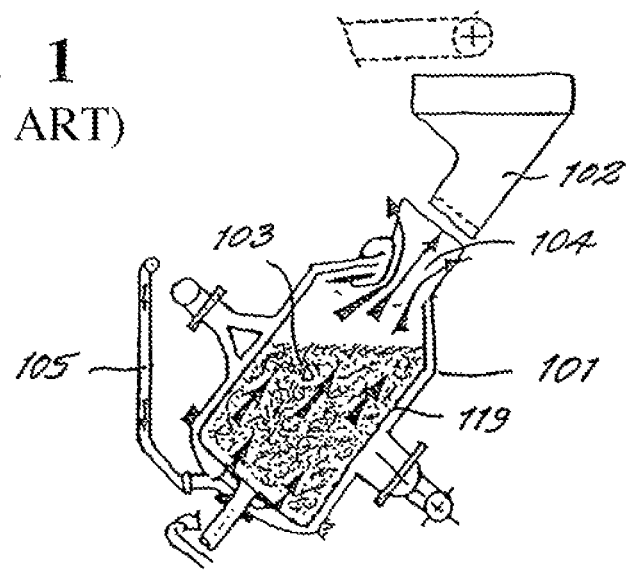
FIGS. 1-6 illustrate selected significant features of a number of prior art arrangements relating to steam peeling.
Figure 2:
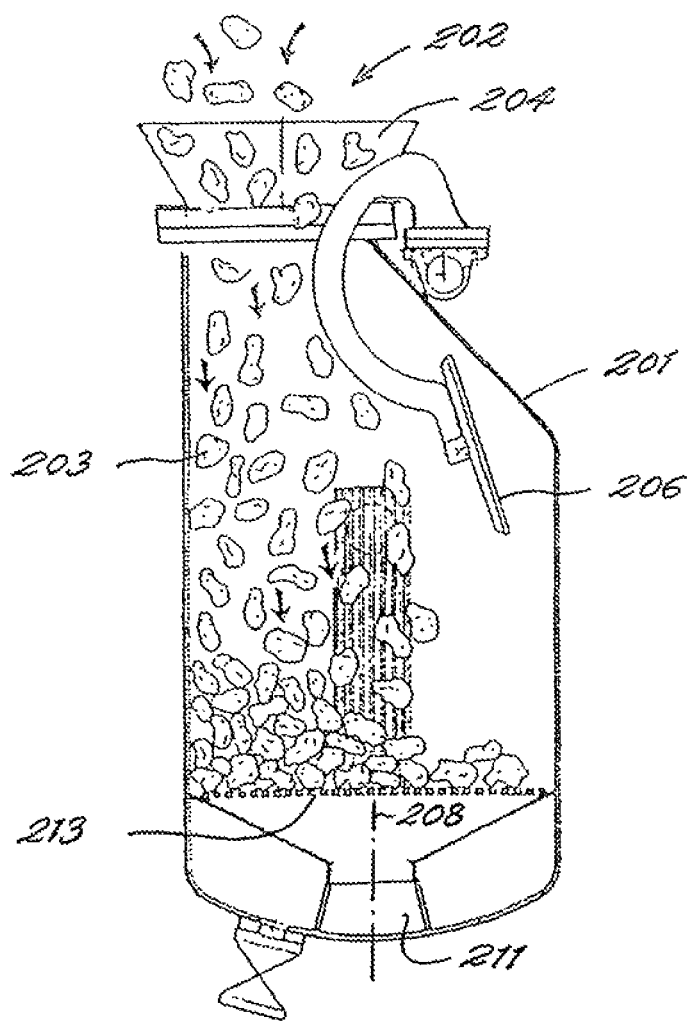
Figure 3:
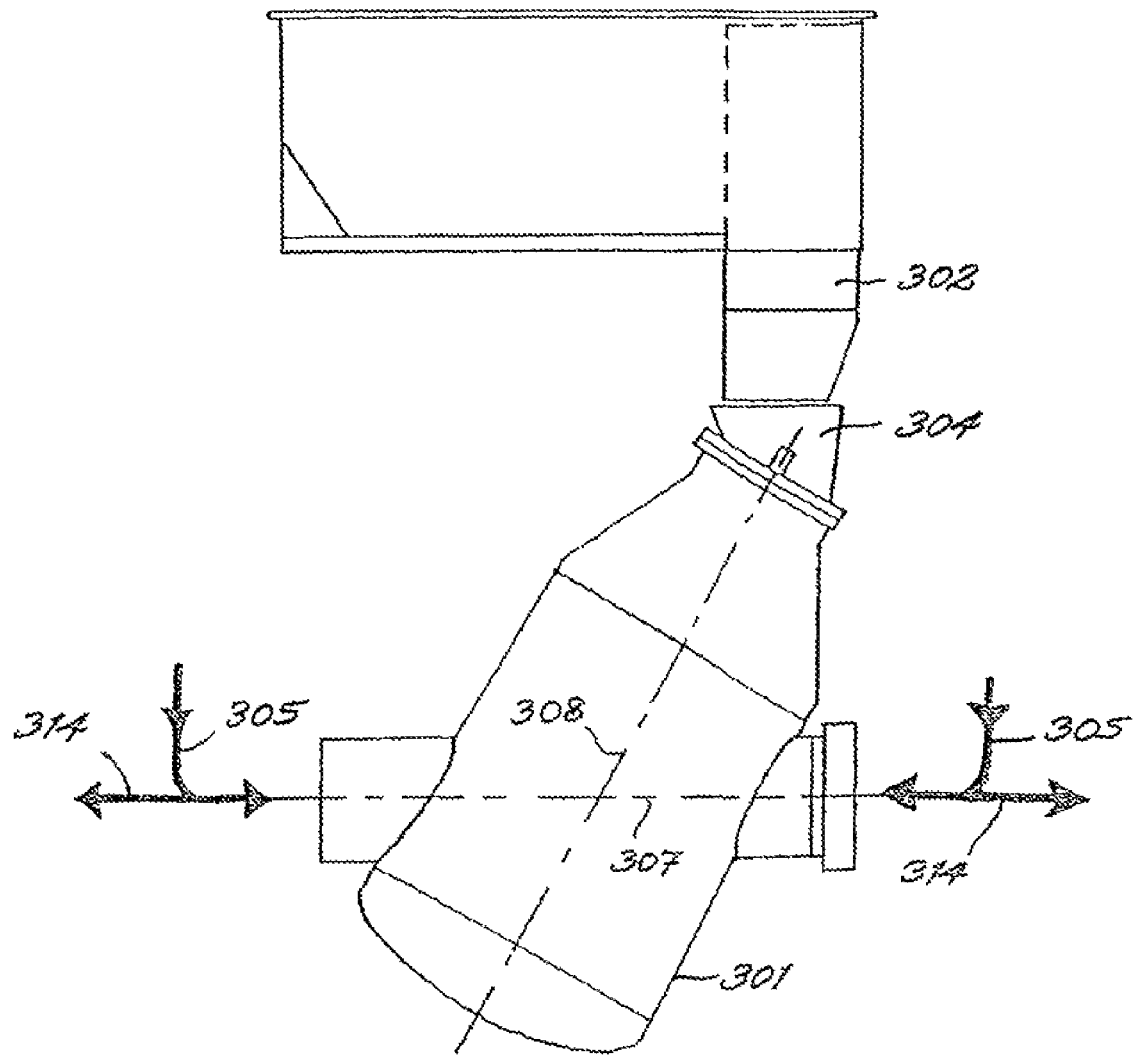
Figure 4:
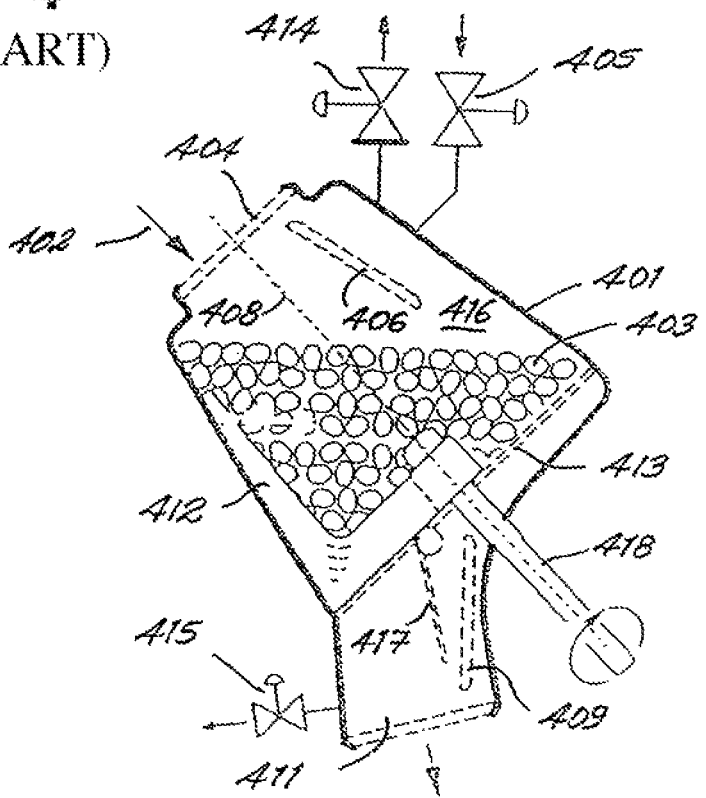
Figure 5:
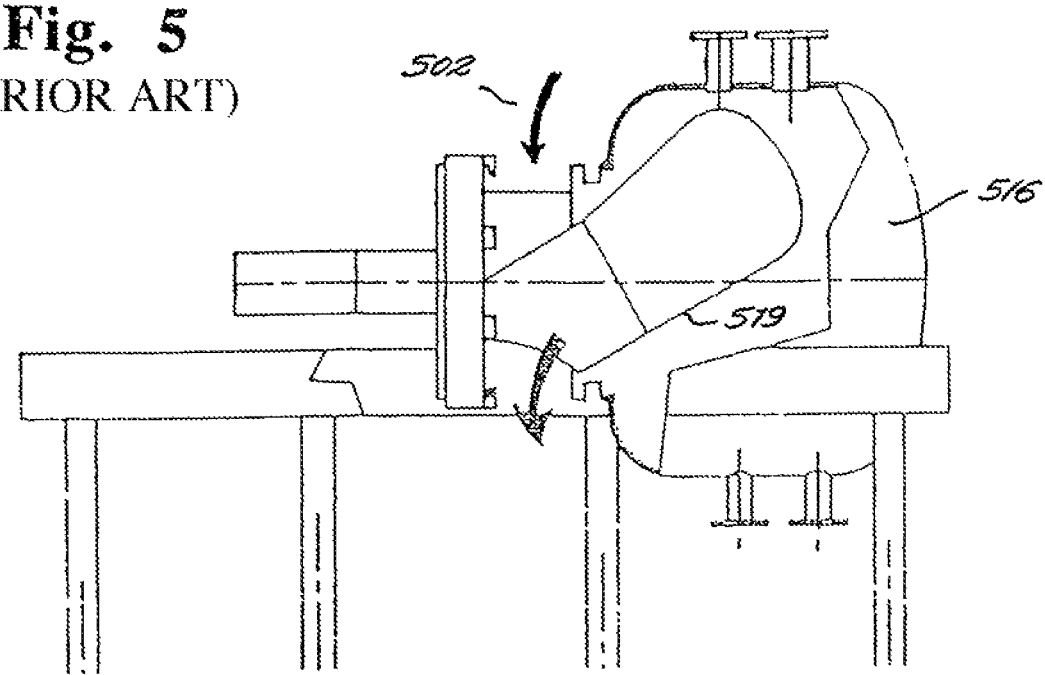
Figure 6:
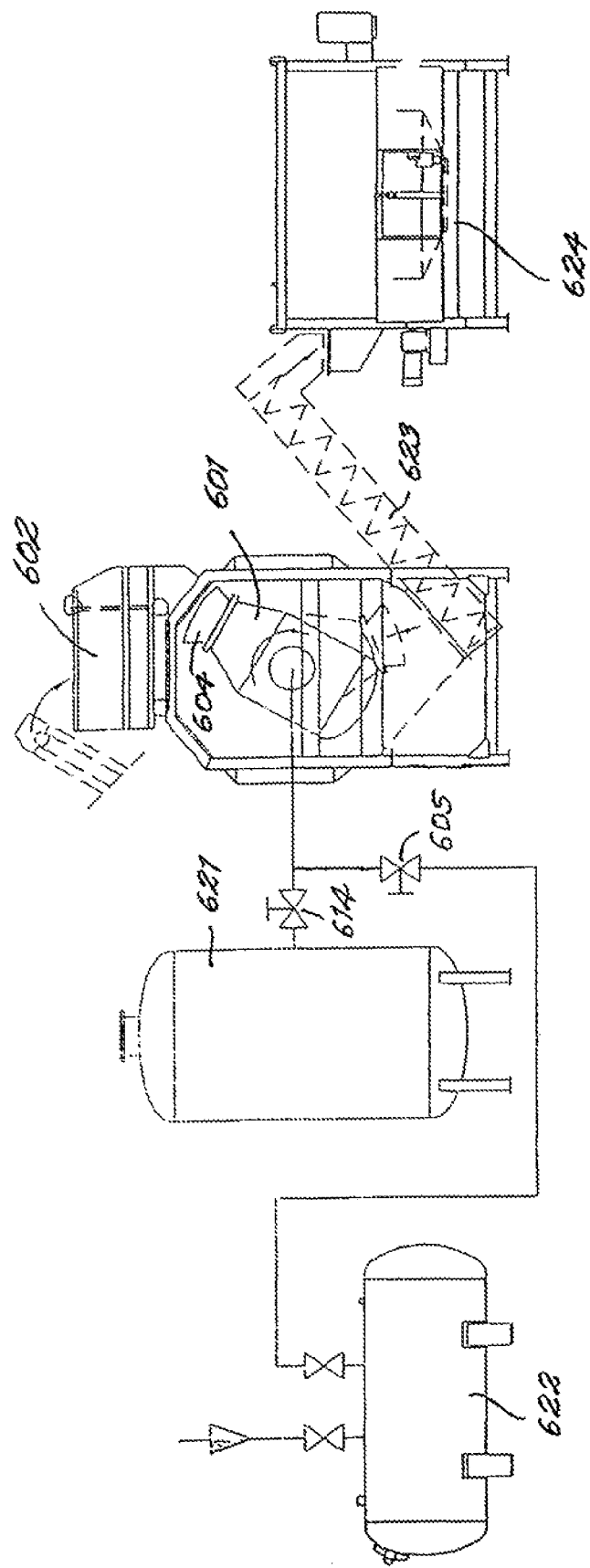

This arrangement according to the invention provides several advantageous improvements. The bore of the passage 14 leading from the pressure vessel 1 to the expansion chamber 21 is larger than in known constructions. An increase in steam duct or passage 14 diameter to 10 inches or 250 mm using a single outlet or port 46 from pressure vessel 1 such as is provided in a preferred embodiment of the pressure vessel 1 represents a very substantial increase in flow area, as compared with a prior art single port diameter of 200 mm. The capacity of the exhaust valve 57 is likewise also increased compared with prior art arrangements, as already noted above, as also is the size of the expansion chamber 21. These improvements result in extremely rapid discharge of steam from the pressure vessel 1 to provide expedited clearance of pressurised steam from the pressure vessel 1. Applicants' prior art system of FIG. 6 provides a clearance time of between 3 and 7 seconds, this being itself significantly better than many other known systems, in which discharge can take as long as 12 seconds, so that the further gain achieved according to the present invention can be seen to be particularly significant.

In the arrangement of the invention, the expansion valve 57 is exposed to pressurised steam during peeling and opens directly into the expansion vessel 21 at the appropriate time. The use of as large an expansion chamber 21 as possible means that discharge directly to atmosphere is to a significant degree simulated. Environmental regulations reasons generally prohibit or exclude the possibility of direct discharge to atmosphere, hence the necessity to interpose an expansion chamber 21, but the desirability of achieving the maximum possible rate of pressure drop into the expansion chamber 21.

As shown schematically in FIG. 15, the expansion valve 57 is an elbow valve with the internal diameter of the flow passage increasing from 10 inches on the input side to 12 inches on the output or discharge side of the valve 57 at the expansion or blowdown chamber 21. Proceeding along the steam line 14 from the 10 inch input side of the valve in the direction of the pressure vessel 1, there are provided in sequence, from the elbow valve 57 end, the steam valve 5, the rotating steam gland 56 with balancing features (not shown), and a pipe section 14 of 10 inches diameter passing through the main bearing 29 (FIGS. 8 and 9), this large diameter pipe section 14 providing for both steam-in and exhaust. Where the steam input or exhaust line 14 enters the pressure vessel 1, the terminal region is covered by the baffle 54 which is a meshed grid having apertures or holes of relatively large size, matched to product size, to stop product 3 exiting into the expansion chamber 21 during the expansion phase. Steam is thus blown in through this perforated baffle 54 and pressurised steam exhausts through it during the exhaust phase. While the baffle 54 prevents exit of whole product 3, the very rapid discharge of steam results in considerable carry-over of fragments of peel and other solid matter, which is not inhibited by the relatively large perforations of the baffle 54, but there is no accumulation of such matter in the expansion vessel 21, as the vessel 21 is flushed out at frequent intervals, and any solid matter carried into it tends to be entrained/liquidised and removed through a drain or solids separation facility provided in chamber 21.

The combination of features provided herein result in substantially instantaneous reduction in pressure in the steam peeler vessel 1 when exhaust takes place. Here "substantially instantaneous" means a pressure drop taking place in a time period typically less than 1 second. It is not necessary to program any exhaust time as such, as the exhaust phase is delimited by the very rapid release of pressure from the peeler vessel 1 and by the valve 57 opening time, which is also very short. Thus, by mounting the exhaust valve 57 substantially directly on or at the decompression or expansion vessel 21, substantial maximization of the possible pressure drop can be realized. The exhaust vessel 21 and the expansion valve 57 are accordingly effectively combined, for optimisation of the pressure drop. There is no separate duct communicating between expansion valve 57 and chamber 21. The exceedingly rapid blowdown achieved by the invention may be further augmented or enhanced by vacuum effect or like arrangements within the chamber 21, such as water spray, subsequently described. There is therefore effectively instant exhaust via the exhaust valve 57 and the very short steam exhaust path or line 14 from the peeling vessel 1 to the expansion vessel or chamber 21.

Figure 16:
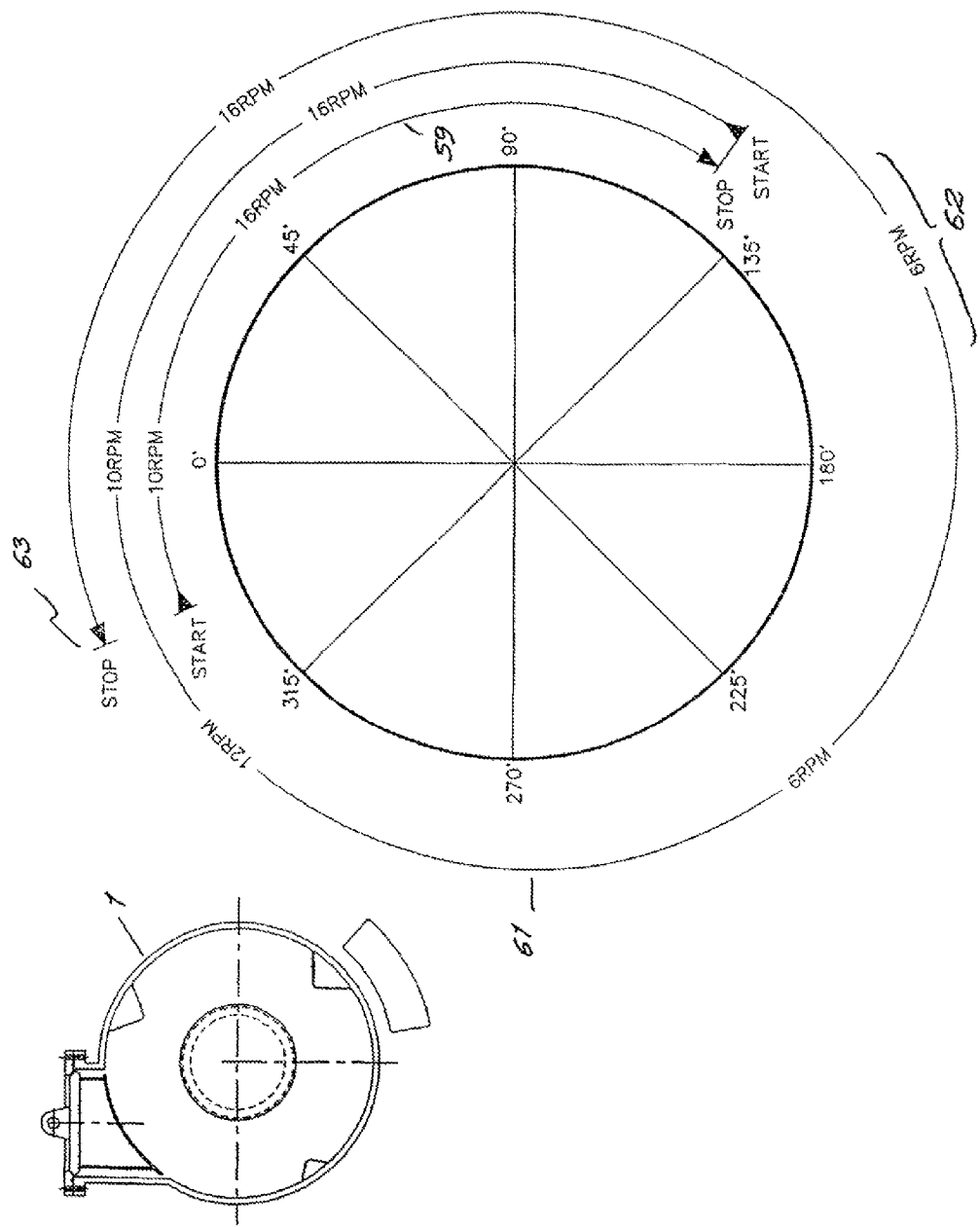

FIG. 16 shows a rotational program for a pressure vessel for one complete cycle. Clockwise and anticlockwise are referred to the unit 1 in the orientation of the miniature representation of FIG. 12 in the top left hand corner of FIG. 16. Initial rotation is clockwise from the disposition of FIG. 12 so as to ensure that any product 3 in the vicinity of the door 6 falls away from the door port 4 and does not interfere or block the closing action of the door 6. The operation commences from the upwardly oriented loading position of vessel 1. Following loading of product 3 with closure of door 6, rotation commences to the right during this period of the rotation, i.e., clockwise as shown in FIG. 16, at an initial speed of for example about 10 rpm, accelerating to typically about 16 to 18 rpm. This phase of the rotational program is designated by reference 59. This initial rotation as shown is carried through approximately 170°, but the precise angular extent of this phase of the rotation is dependent on steam time. Rotation of the vessel 1 is then reversed, the pressure vessel 1 returning anticlockwise initially for example at a rotational speed of the order of 16 rpm and then slowing and accelerating again, before finally slowing to a rotational speed of suitably approximately 6 rpm as the door 6 region moves into towards a downwardly oriented disposition. This phase of the rotational program is designated by reference 61.

This reversal of rotation is an especially significant feature of the rotational program. In particular, the initial rotation from the start position is in the opposite direction to the direction of rotation during the final dump or discharge operation. The reversal of the direction of rotation is effected during the process, i.e., during the steam/exhaust phase. Prior art peelers involving rotation of a pressure vessel rotate in the dump direction from the start of the treatment process and there is no reversal of direction. While the vessel 1 is directed upwardly during this reverse or return phase of rotation, the steam pressure within the pressure vessel 1 is relieved and the door 6 is opened. The door opening takes place during vessel rotation, so that as the rotational cycle proceeds into the orientation of the pressure vessel 1 in which the door 6 region and the discharge and loading port 4 are downwardly directed, i.e., region 62 of the second phase of the rotational program (reference 61) in FIG. 16. The door 6 is then open so that product 3 can discharge in an unobstructed manner through the port 4 onto downstream handling equipment. Speed is reduced to of the order of 6 rpm during this discharge period of the rotational program, while the door 6 is open and directed downwardly. As the vessel reaches the 135O position as shown in FIG. 16, rotation is again accelerated to about 16 rpm to bring the now open port 4 back to the loading position, where rotation stops at reference 63 and a further batch of product 3 is charged to the pressure vessel 1 and the entire cycle commences once again. The speeds achieved during rotation in the present system are in the range of 6-20 rpm, as compared with a range of 6-10 rpm in the prior art.

The speed of rotation is relevant to the quality of the mixing. In known peeling vessels of drum-shaped configuration, the peripheral speed of product closer to the axis of rotation is considerably lower than that of product at the maximum radius or spacing from the axis of rotation. By contrast, substantially uniform peeling performance is achieved at all locations throughout the pressure vessel 1 because of product 3 being disposed at substantially constant radius during the treatment process and also because there is effective mixing action of product 3 during rotation so as to ensure that each product item 3 is exposed to substantially uniform conditions, both in terms of exposure to steam and travel, in aggregate over the duration of an operating cycle.

The rotational program is particularly efficient, in that there is a minimum of wasted time. By reversing rotation following an initial steaming period and relieving the steam pressure and opening the door 6 during the reverse rotation, the product 3 is ready for rapid unloading or discharge within substantially an absolute minimum of time from the start of the steam cycle. Relieving pressure and opening the door 6 during that segment of the reverse rotation 61 during which the door 6 and the port region 4 are directed upwards also means that an inwardly-opening door 6 may be successfully actuated and opened without encountering or being hindered by product 3 within the pressure vessel 1. In prior art arrangements, where unidirectional rotation is in question, the product may require to remain in the pressure vessel for a rotation period which is required solely for port orientation purposes, but is not necessary from the point of view of peeling treatment.

Travel between completion of the unloading and positioning of the inlet port 4 for receipt of the next product 3 load is also substantially minimized. Thus, in the present system, every phase of the rotational program is constructively used for some defined and necessary activity, and unnecessary or wasteful displacements and/or operations are substantially eliminated or minimized. This is especially the case in respect of the door opening and closing operations, which are effected during rotation, thereby saving time, since these operations are typically effected when the vessel is static in known constructions. The enhanced rotational program accordingly provides effectively substantially non-stop rotation, including a reversal of direction, but without this reversal entailing any significant standstill period other than a momentary stop condition for reversal of drive, except during the filling phase. Rotation does not stop for discharge or unloading of the pressure vessel 1, which takes place however during a reduced-speed portion of vessel 1 rotation. The rotational program is established by suitable control systems, which may be embodied in software, and to which the scope of the invention also extends. Reversal may also be effected at any time, while the direction of initial rotation after filling, as indicated above, allows greater loads to be accommodated.

These features of the invention, in particular reversal of rotation, are particularly facilitated by the relatively small size and low rotational inertia of the pressure vessel 1, especially as compared with prior art units. The present vessel 1 is also distinguished by being particularly well-balanced. The present vessel 1 is thus distinguished from the prior art or known peelers by providing for rotation in both directions as compared with the unidirectional rotation of conventional arrangements. Along with this reversal of rotation, the control system further provides for dead time to be minimized as compared with the steam time.

FIGS. 17 and 18 show a variant of the vessel, providing for separation and/or removal of condensate within a pressure vessel 1. As shown in these drawings, a perforated or apertured condensate floor or liner 64 is provided around the periphery 48 of the vessel 1, extending substantially from the vicinity of one side 65 of the entry point 4 in the circumferential or peripheral direction over approximately three quarters of the circumference 48, to terminate in the clockwise direction as shown in FIG. 17 slightly short of the opposite side 66 of the entry duct 49 or port 4. Alternatively, the liner 64 may extend right up the side 66 of the entry duct 49. The floor 64 commences at the short axial extent side 65 of mouth 4 ducting 49 and terminates short of the other side 66 of ducting or nozzle 49 which is of greater axial extent. As shown in the drawings, two condensate removal ports 67 are provided so that condensate may be extracted or removed from the vessel 1 while the vessel 1 is in motion. This aspect of the arrangement is however, optional, and condensate separated from product 3 during rotation of the pressure vessel 1 may merely remain within the vessel 1 underneath the perforated liner 64, either in the lower portion of the vessel 1 under the action of gravity, or alternatively by being engaged against the inner side 48 of the outer wall of the vessel 1 by centrifugal force. This perforated liner or apertured condensate floor feature 64 is particularly relevant to small product, such as for example, small carrots. The provision of this condensate separation feature 64 within the pressure vessel 1 avoids product 3 lying in condensate at any time during the peeling phase and in particular during the rotational action.

As shown in FIG. 17 in particular, in this variant of the invention, the lifters 51a, 51b and 51c are incorporated in the false bottom or condensate liner 64. The lifters 51a, 51b and 51c are defined by a series of internally directed indents or protrusions in the perforated floor 64. As compared with previous embodiments, the lifters 51*a*, 51*b*, 51*c* in this variation do not take the form of steam savers. As previously indicated, the lifting or agitating or mixing effect achieved by the lifter features 51*a*, 51*b*, 51*c* is independent of the steam saving aspect of the invention, although it may in certain embodiments be provided by combining lifting and steam saving. In the arrangement of FIGS. 17 and 18, lifting is effected by the radially inward projections 51*a*, 51*b*, 51*c* of the perforated condensate floor 64 and these are provided entirely separately from any possible steam saving feature.

The provision of a false floor 64 or other arrangement for separation of condensate is said to be justified in order to avoid product 3 undergoing peeling treatment from sitting in condensate when condensate is formed, with the establishment of a barrier by this condensate against fast heat transfer between steam and product 3.

The condensate barrier is said to lead to longer steam times being necessary and thus lower yields by virtue of higher peel and flesh loss. A second justification for condensate separation and/or removal is said to be that if condensate has not been removed, a proportion of it will flash back to steam, at the exhaust stage, thus increasing the exhaust or steam evacuation time. However, any possible condensate barrier problem is less significant when the product 3 is of relatively large dimensions, such as a large potato, because the amount of condensate formed on large product 3 is relatively small and is insufficient to cover even part of the surface region of the product 3. Secondly, in the present system where the rotation is relatively fast, product 3 is constantly moving with a high degree of mixing and product distribution, so that no individual product 3 has the opportunity to remain in contact with condensate for more than a brief period of time. Thus the necessity for separation of product 3 from condensate is by and large limited to very small products, such as baby carrots, in which circumstances the provision of the false bottom arrangement 64 described above becomes appropriate. Even in such circumstances, there is no effective time saving, in a system in accordance with the invention, due to less condensate being flashed off to exhaust, because of the significantly accelerated and very brief exhaust time achieved in the present peeling unit 1.

Figure 19:
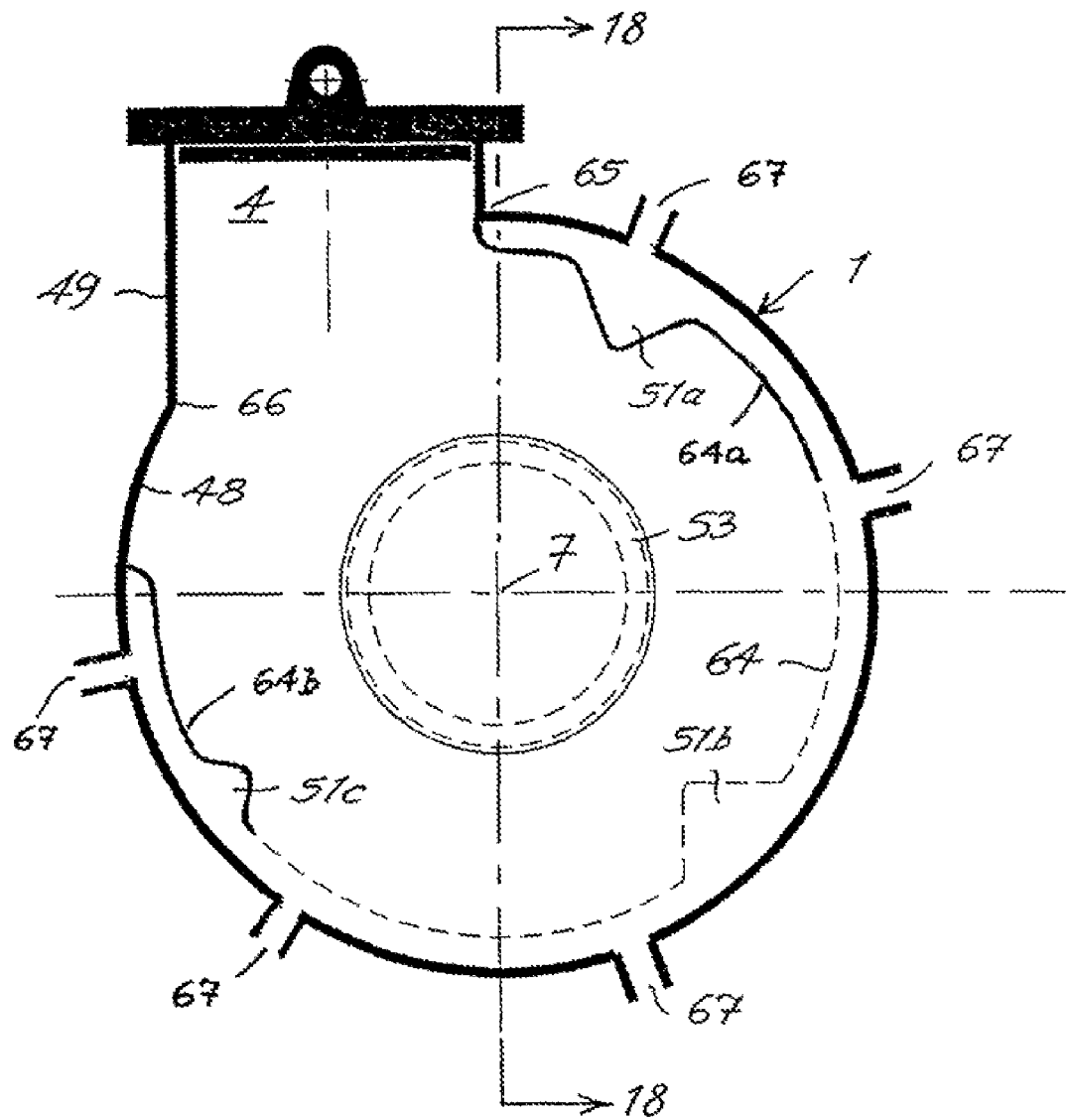

FIG. 19 shows a further variant of the vessel providing for separation and/or removal of condensate within a pressure vessel 1. As shown in this drawing, the condensate floor or liner 64 is again provided around the periphery 48 of the vessel 1. As compared with FIG. 17, however, in this variant, end regions 64*a*, 64*b* of the floor 64 are imperforate or non-apertured, i.e., solid, while the intervening region 64*c* is again apertured. Thus, pockets or condensate collecting regions are formed under the end portions (in the circumferential direction) of the floor, in which pockets condensate may accumulate during rotation. In this modification, up to five condensate removal ports 67 may be provided so that condensate may be extracted or removed from the vessel 1 while the vessel 1 is in motion or otherwise, both from beneath the "solid" false floor portions 64*a*, 64*b* and also from underneath the perforated liner portion 64*c*, either from the lowermost portion of the vessel, during vessel movement, under the action of gravity, or alternatively by being engaged against the inner side 48 of the outer wall of the vessel by centrifugal force. The ports 67 in the non-apertured floor region are optional. Thus, in this version of the invention, the non-apertured floor regions define spaces in which condensate which collects or accumulates during rotation may be gathered or collected and held, at least temporarily, for a period during the process, for optional release at any selected time.

The remaining features of the construction of FIG. 19 are in accordance with these of FIG. 17.

Figure 20:
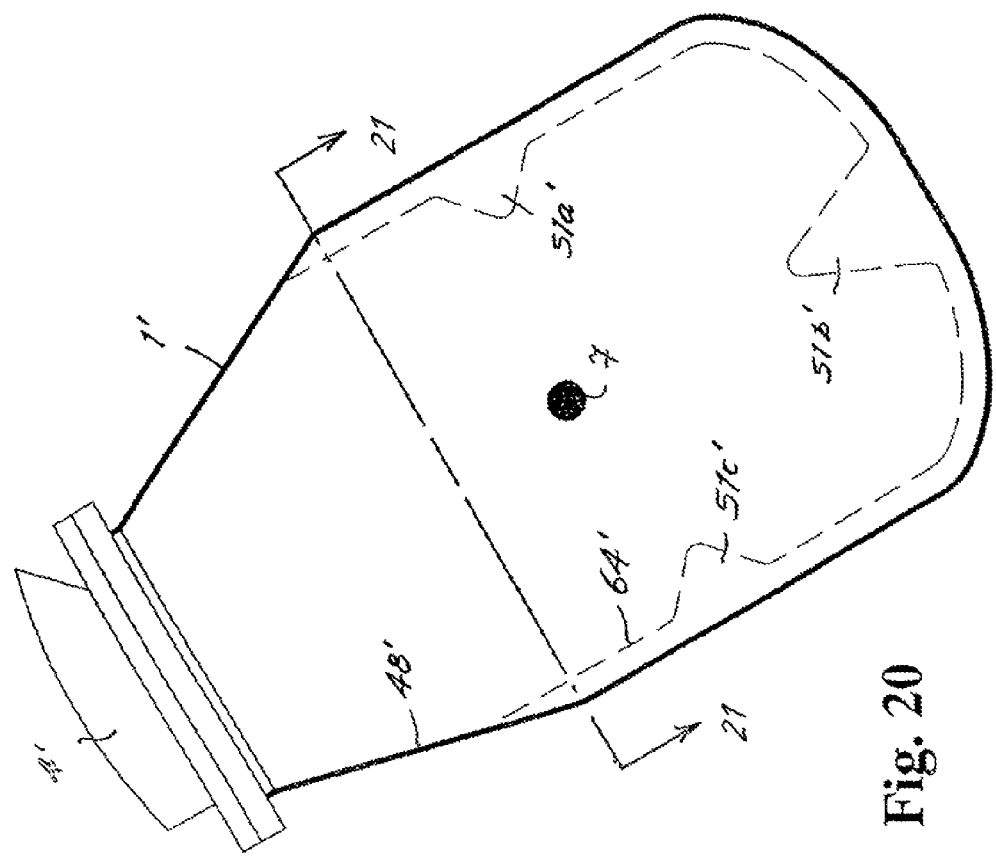
Figure 21:
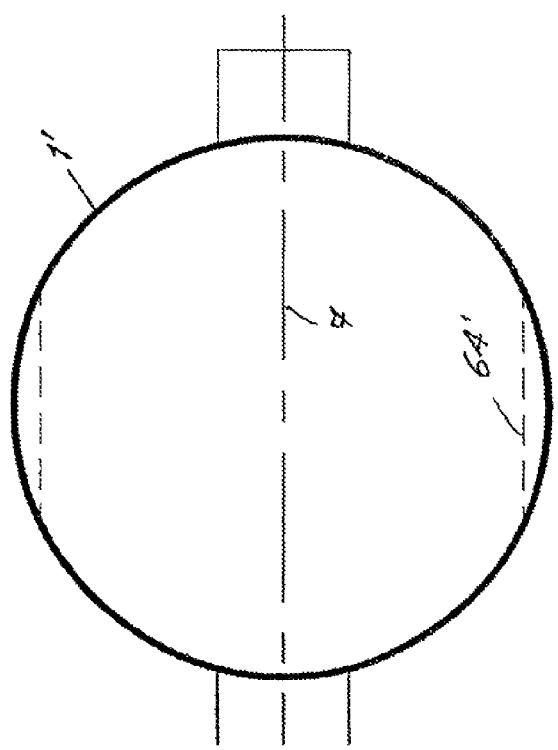

Referring now to FIGS. 20 and 21, there is illustrated the provision of a lifting arrangement 51*a*, 51*b*, 51*c* of the present vessel 1 within a steam peeling vessel 1' of known or substantially conventional construction. In this prior art pressure vessel, the unit 1' has a generally cylindrical form and is rotated about a transverse axis 7 perpendicular to the longitudinal axis of the vessel 1'. The door and loading and discharge point 4' are located at one axial end of this elongate vessel 1'. As shown in FIGS. 20 and 21, the vessel 1' is provided with a series of lifting features, 51*a*', 51*b*' and 51*c*' these being defined by indents or protrusions directed inwardly from the region of the inner wall 48' of the pressure vessel and defined, in the particular embodiment shown, by inward indentations or protrusions formed in a perforated condensate floor or liner 64' as described in connection with the vessel of FIGS. 17, 18 and 19. However, the provision of lifters 51*a*', 51*b*' and 51*c*' within this pressure vessel 1' of conventional or prior art design is not confined to arrangements in which they are formed by deformations of a condensate floor 64'. In variants of the invention, the inwardly directed lifters 51*a*', 51*b*', 51*c*' can be defined by independent features, appropriately located on suitable regions of the inner wall 48' of the pressure vessel 1', such as welded on angled plate portions, as previously described, and the lifters 51*a*', 51*b*', 51*c*' can then also define steam savers as understood in terms of the present invention.

The vessel 1, 1' provides exceptionally good product mixing during steam treatment. Within the rotational speed range specified, not only is the degree of mixing good, but the mixing action is such that there is also minimal damage to product 3, for example potatoes or also small carrots. Even in the event of an extended mixing period, not usual in conventional operation, the level of damage is nonetheless minimized. The mixing action is such that products 3 such as potatoes or small carrots roll at all times and there is no throwing of product 3. The mixing action is directed to enabling steam to access each individual product 3, and this is facilitated by the tumbling action according to the present system. The action provided by the present invention is to be distinguished from the stirring type mixing used in other technologies, where the objective is to effectively integrate or sift together a multiplicity of different media. In the present invention, the objective is to give access for steam to the external surface of every product item 3 to an optimum extent.

Figure 22:
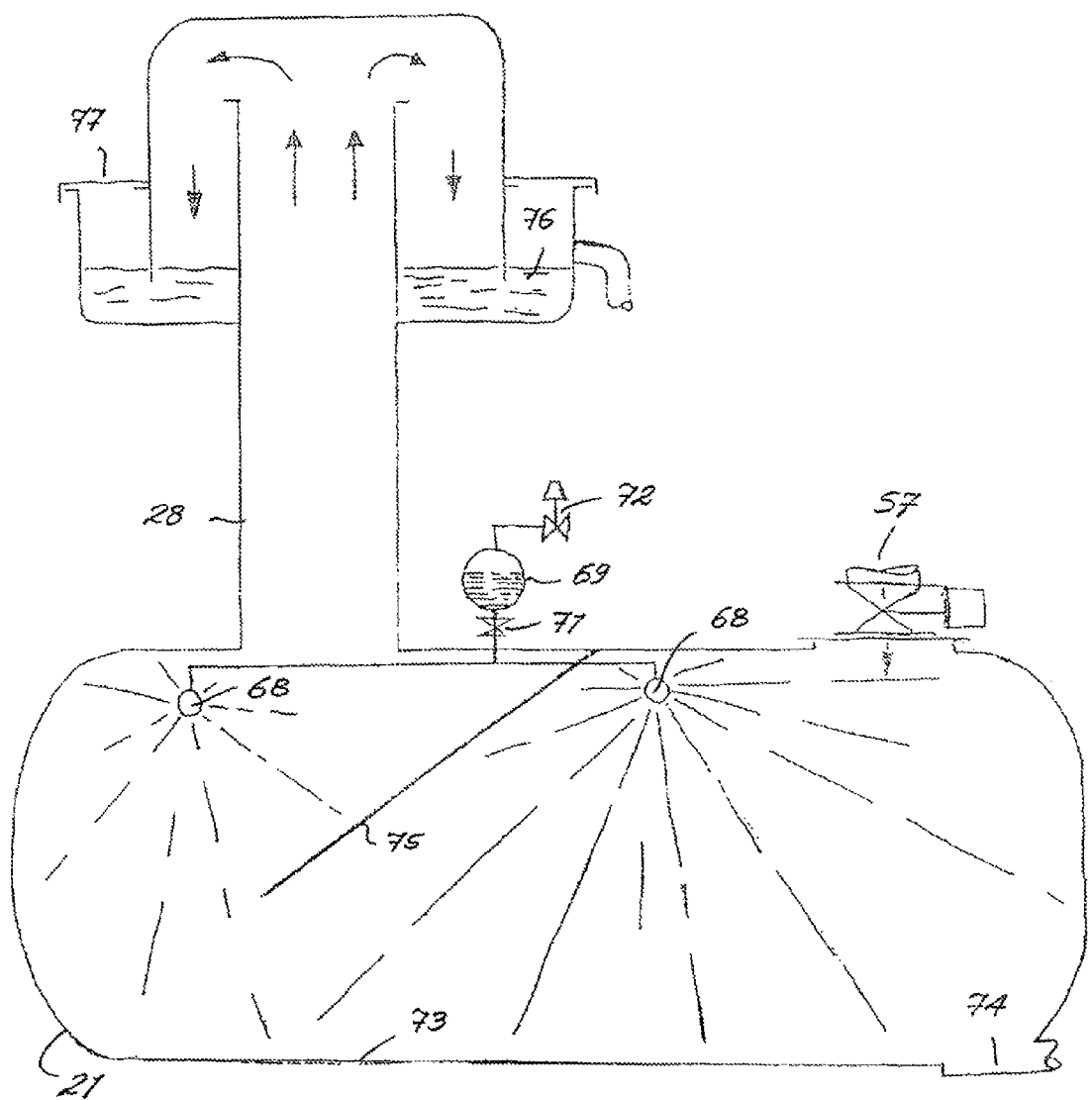
FIGS. 22-23 illustrate detailed arrangements for trapping or entraining solids and reducing odor in exhaust emissions as well as accelerating pressure reduction during steam discharge from the pressure vessel.

Moving on now to the expansion chamber and steam discharge features of the system, FIG. 22 shows the expansion chamber 21. Steam enters the expansion chamber 21 at valve 57 from the steam peeler pressure vessel 1 in the manner already described and the volume of the expansion chamber 21 is sufficient for very rapid reduction of pressure as the steam discharges into it. In order however to ensure the speediest possible final drop in pressure towards atmospheric at the end of the discharge cycle, the arrangement of FIG. 22 also incorporates a water spray feature 68. A volume of water in a pressure vessel 69 for supply of spray water is pressurised by an air line or booster pump and is blown through water balls or spray heads 68 when the pressure in the blowdown pressure vessel 21 falls to a predetermined value. Release or discharge of this water into the expansion chamber 21 is regulated by a water release valve 71. A pressure regulator 72 controls the air pressure applied to the spherical pressure vessel 69 to ensure constant water pressure at the water balls 68. Water is sprayed in at the end of the blowdown cycle, when the pressure in the peeler pressure vessel 1 drops to approximately 0.3 bar. This ensures continued pull-down of pressure within the expansion chamber 21 towards the end of the discharge cycle, there being no difficulty in achieving rapid, effectively substantially instantaneous pressure drop at the start of the exhaust phase. In practice, the extremely rapid drop in pressure results in the water spray 68 becoming activated about 0.5 seconds into the discharge or pressure drop phase. The rapid expansion and accelerated reduction in pressure is further facilitated by use of a large diameter stack 28.

Other features of the arrangement are a sloping floor 73 to the expansion chamber 21, for collection of condensate at a sump 74, and a baffle 75 located between the steam entry point and the discharge duct or stack 28. Baffle 75 extends downwards at an acute angle from the roof of the chamber 21 towards the stack 28 region of the chamber 21 and terminates at a location where its free end region substantially underlies, at least in part, the exit point where steam leaves the chamber 21 and enters the stack 28. In order to reduce carryover of solids and/or odor to the external environment, a water trap 76 is provided at the top end of the stack, so that discharge vapors are bubbled through this water trap 76 before reaching atmosphere at outlet zone 77. In order to ensure that the discharge duct or stack 28 in no way throttles the reduction of pressure in the expansion chamber 21, the stack 28 provides substantially greater cross-sectional flow area than prior art arrangements, typically greater by a factor of 4.

Figure 23:
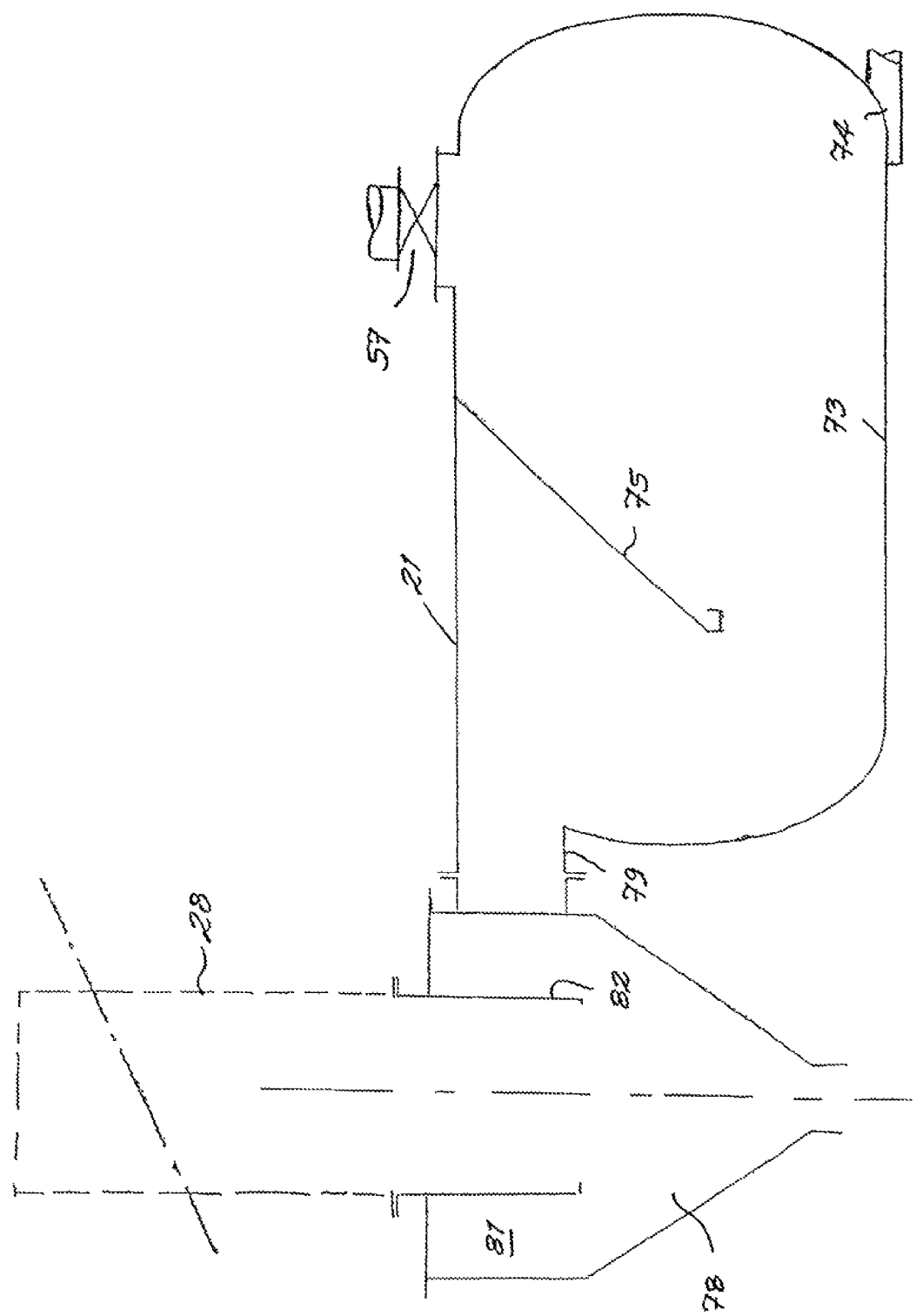

FIG. 23 shows a further variant, in which the discharge stack 28 does not exit directly from the expansion chamber 21 proper, but rather from a solids trap 78, defined by a hopper-type structure communicating with the expansion chamber 21 by way of a duct 79 of large dimensions. The stack 28, again of large cross-sectional area, exits from an upper region 81 of this solids trap, but has a downwardly projecting flange or extension 82 extending in part into the solids trap 78, so that steam or vapor exiting from the expansion chamber 21 is required to follow a convoluted path from the upper stream entry region 81 of the solids trap 78 initially in a downwards direction, to turn around the edge of the downwardly projecting flange or extension 82 and then discharge upwards through the stack 28. In this way, a type of baffle structure is provided.

In all variants of the stack structure 28, it is preferred that a relatively tall or elongated stack structure 28 be used in conjunction with the odor containment and solids trapping features of the invention.

The present steam peeling system, which includes a steam peeler pressure vessel, a pressure relief or reduction arrangement for exhausting steam from the steam peeler pressure vessel, as well as arrangements for environmental treatment of steam exhaust or discharge from the steam peeler pressure vessel and its control system, can improve productivity.

The words "comprises/comprising" and the words "having/including" when used herein with reference to the present invention are used to specify the presence of stated features, integers, steps or components but does not preclude the presence or addition of one or more other features, integers, steps, components or groups thereof.

What is claimed is:

1. A steam peeling system comprising:
    a rotatable pressure vessel supported for rotation about an axis of rotation and having an opening for loading the vessel with product to be peeled and discharging the product from the vessel, the product being receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly; the vessel having an oblate spheroid form;
    a door for sealing the opening of the pressure vessel between an open disposition, in which the door is located within the container, and a sealed disposition in which the door closes the opening of the pressure vessel from an interior of the vessel;
    a steam introducing device that introduces pressurized steam into the pressure vessel while the pressure vessel is loaded with the product to be peeled for a steam treatment of the product; and
    a rotating device that rotates the pressure vessel about the axis of rotation of the pressure vessel,
    wherein the pressure vessel includes a plurality of lifters inside the pressure vessel for entraining and lifting the product about the axis of rotation of the pressure vessel during rotation of the pressure vessel, and
    wherein each of the lifters protrudes substantially radially inwardly from a region of an interior wall surface of the pressure vessel and is configured to assist lifting and mixing of the product to be peeled to enable steam to access each individual product.

2. The steam peeling system according to claim 1, further including means for substantially instantaneously reducing the pressure in the pressure vessel.

3. The steam peeling system according to claim 2, wherein the means for substantially instantaneously reducing pressure in the pressure vessel comprises a port for discharging pressurized steam, and the ratio between the volume of the pressure vessel in liters and the area of the port in square inches is in the range 10:1 to 20:1.

4. The steam peeling system according to claim 3, wherein said ratio is about 14:1.

5. The steam peeling system according to claim 4, wherein steam entry and steam exhaust takes place through the port.

6. The steam peeling system according to claim 1, further comprising an expansion chamber for receiving pressurized steam discharged from the pressure vessel, and means for releasing the pressurized steam from the pressure vessel into the expansion chamber, the pressurized steam releasing means being located substantially at the point of entry of steam into the expansion vessel.

7. The steam peeling system according to claim 6, wherein the cross-sectional flow area of the pressurized steam releasing means increases progressively from an inlet region thereof to a discharge region thereof.

8. The steam peeling system according to claim 6, wherein the pressurized steam releasing means comprises a valve.

9. The steam peeling system according to claim 1, further including an expansion chamber for receiving pressurized steam discharged from the pressure vessel, and means for releasing steam or vapor or both from the expansion chamber to atmosphere, the releasing means comprising an arrangement for substantially minimizing release of entrained solid matter or odors or both in steam or vapor or both leaving the expansion chamber.

10. The steam peeling system according to claim 1, further including a mechanism for displacing the door located entirely externally of the pressure vessel so that the enclosed interior region of the pressure vessel defines an internal void space around the door in the sealed disposition that is a substantially smooth continuation of the internal surface of the pressure vessel throughout the region of the opening, wherein the door is hingedly mounted on the pressure vessel and is pivotable between the open and closed dispositions of the door.

11. The steam peeling system according to claim 1, wherein each of the lifters defines a closed region that is not in communication with the remainder of interior space within the pressure vessel for the movement of gas or vapor between the closed region and the remainder of the interior space within the pressure vessel.

12. The steam peeling system according to claim 1, further including a rotary batching unit for cooperation with the pressure vessel, the rotary batching unit having a plurality of compartments arranged for advancing movement within an enclosing housing, for selective successive alignment of each compartment with a product loading location and subsequent alignment of the compartment with a location for discharge of the product to the pressure vessel.

13. The steam peeling system according to claim 12, wherein each compartment of the batching unit is defined between radially spaced apart and radially extending blades or vanes mounted for rotation about a common axis.

14. The steam peeling system according to claim 13, wherein the batching unit is mounted by way of weighing means for computation of the weight of product accommodated by the batching unit.

15. A steam peeling system comprising:
a rotatable pressure vessel supported for rotation about an axis of rotation and having an opening for loading the vessel with product to be peeled and discharging the product from the vessel, the product being receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly;
a door for sealing the opening of the pressure vessel between an open disposition, in which the door is located within the container, and a sealed disposition in which the door closes the opening of the pressure vessel from an interior of the vessel;
a steam introducing device that introduces pressurized steam into the pressure vessel while the pressure vessel is loaded with the product to be peeled for a steam treatment of the product;
a rotating device that rotates the pressure vessel about the axis of rotation of the pressure vessel;
an expansion chamber for receiving pressurized steam discharged from the pressure vessel, and means for releasing steam or vapor or both from the expansion chamber to atmosphere, the releasing means comprising an arrangement for substantially minimizing release of entrained solid matter or odors or both in steam or vapor or both leaving the expansion chamber; and
a baffle located within the expansion chamber and a solids trap located in the interior of the expansion chamber or located substantially at the exit location from a stack communicating between the interior of the expansion chamber and atmosphere,
wherein the pressure vessel includes a plurality of lifters inside the pressure vessel for entraining and lifting the product about the axis of rotation of the pressure vessel during rotation of the pressure vessel,
wherein each of the lifters protrudes substantially radially inwardly from a region of an interior wall surface of the pressure vessel and is configured to assist lifting and mixing of the product to be peeled to enable steam to access each individual product.

16. A steam peeling system comprising:
a rotatable pressure vessel supported for rotation about an axis of rotation and having an opening for loading the vessel with product to be peeled and discharging the product from the vessel, the product being receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly;
a door for sealing the opening of the pressure vessel between an open disposition, in which the door is located within the container, and a sealed disposition in which the door closes the opening of the pressure vessel from an interior of the vessel;
a steam introducing device that introduces pressurized steam into the pressure vessel while the pressure vessel is loaded with the product to be peeled for a steam treatment of the product; and
a rotating device that rotates the pressure vessel about the axis of rotation of the pressure vessel,
wherein the pressure vessel includes a plurality of lifters inside the pressure vessel for entraining and lifting the product about the axis of rotation of the pressure vessel during rotation of the pressure vessel,
wherein each of the lifters protrudes substantially radially inwardly from a region of an interior wall surface of the pressure vessel and is configured to assist lifting and mixing of the product to be peeled to enable steam to access each individual product,
wherein each of the lifters is defined by an upstanding portion of a false floor that is spaced from an interior wall surface of the pressure vessel.

17. The steam peeling system according to claim 16, wherein at least a portion of the false floor is apertured for passage of condensate through the apertures of the false floor, so that condensate accumulates in the region between the false floor and the interior wall surface of the pressure vessel.

18. The steam peeling system according to claim 16, wherein at least a portion of the false floor is non-apertured to provide a region for at least temporary retention of condensate accumulation during rotation of the vessel.

19. The steam peeling system according to claim 18, further including means for enabling removal of condensate from the region between the false floor and the interior wall surface of the pressure vessel.

20. A steam peeling system comprising:
a rotatable pressure vessel supported for rotation about an axis of rotation and having an opening for loading the vessel with product to be peeled and discharging the product from the vessel, the product being receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly;
a door for sealing the opening of the pressure vessel between an open disposition, in which the door is located within the container, and a sealed disposition in which the door closes the opening of the pressure vessel from an interior of the vessel;
a steam introducing device that introduces pressurized steam into the pressure vessel while the pressure vessel is loaded with the product to be peeled for a steam treatment of the product; and a rotating device that rotates the pressure vessel about the axis of rotation of the pressure vessel,
at least one internal region that is closed-off against ingress of steam during product treatment, the at least one region defining a steam saver,
wherein the pressure vessel includes a plurality of lifters inside the pressure vessel for entraining and lifting the product about the axis of rotation of the pressure vessel during rotation of the pressure vessel,
wherein each of the lifters protrudes substantially radially inwardly from a region of an interior wall surface of the pressure vessel and is configured to assist lifting and mixing of the product to be peeled to enable steam to access each individual product.

21. The steam peeling system according to claim 20, wherein the at least one internal region is defined within an enclosure, all portions of which are spaced apart from any interior wall surface of the pressure vessel.

22. The steam peeling system according to claim 20, wherein the at least one internal region that is closed-off against ingress of steam during product treatment is defined by at least one of the lifters.

23. The steam peeling system according to claim 20, wherein the at least one internal region that is closed-off against ingress of steam during product treatment is provided on the side of the door of the pressure vessel, which side is directed toward the interior of the vessel.

24. The steam peeling system according to claim 20, wherein the at least one internal region that is closed-off against ingress of steam during product treatment is provided with an enclosure located on a wall portion of the vessel in the vicinity of the axis of rotation of the vessel, which axis lies substantially along an axis of symmetry of the vessel.

25. A steam peeling system comprising:
a rotatable pressure vessel supported for rotation about an axis of rotation and having an opening for loading the vessel with product to be peeled and discharging the product from the vessel, the product being receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly; the vessel having a substantially round cross section along its axis of rotation, and the opening being positioned parallel to the axis of rotation of the vessel;
a door for sealing the opening of the pressure vessel between an open disposition, in which the door is located within the container, and a sealed disposition in which the door closes the opening of the pressure vessel from an interior of the vessel;
a steam introducing device that introduces pressurized steam into the pressure vessel while the pressure vessel is loaded with the product to be peeled for a steam treatment of the product; and
a rotating device that rotates the pressure vessel about the axis of rotation of the pressure vessel,
wherein the pressure vessel includes a plurality of lifters inside the pressure vessel for entraining and lifting the product about the axis of rotation of the pressure vessel during rotation of the pressure vessel, and
wherein each of the lifters protrudes substantially radially inwardly from a region of an interior wall surface of the pressure vessel and is configured to assist lifting and mixing of the product to be peeled to enable steam to access each individual product.

26. A steam peeling system comprising:
a rotatable pressure vessel supported for rotation about an axis of rotation and having an opening for loading the vessel with product to be peeled and discharging the product from the vessel, the product being receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly; the vessel having an oblate spheroid-like form having a substantially round cross section along its axis of rotation, and the opening being positioned parallel to the axis of rotation of the vessel;
a door for sealing the opening of the pressure vessel between an open disposition, in which the door is located within the container, and a sealed disposition in which the door closes the opening of the pressure vessel from an interior of the vessel;
a steam introducing device that introduces pressurized steam into the pressure vessel while the pressure vessel is loaded with the product to be peeled for a steam treatment of the product; and
a rotating device that rotates the pressure vessel about the axis of rotation of the pressure vessel,
wherein the pressure vessel includes a plurality of lifters inside the pressure vessel for entraining and lifting the product about the axis of rotation of the pressure vessel during rotation of the pressure vessel, and
wherein each of the lifters protrudes substantially radially inwardly from a region of an interior wall surface of the pressure vessel and is configured to assist lifting and mixing of the product to be peeled to enable steam to access each individual product.

27. A steam peeling system comprising:
a rotatable pressure vessel supported for rotation about an axis of rotation and having an opening for loading the vessel with product to be peeled and discharging the product from the vessel, the product being receivable into the pressure vessel through the opening in a first orientation of the pressure vessel in which the opening is directed generally upwardly and being dischargeable from the pressure vessel through the opening in a second orientation of the pressure vessel in which the opening is directed generally downwardly; the vessel having a substantially oblate spheroidal shape in at least one view and adapted to have a flattened periphery in at least one other view;
a door for sealing the opening of the pressure vessel between an open disposition, in which the door is located within the container, and a sealed disposition in which the door closes the opening of the pressure vessel from an interior of the vessel;
a steam introducing device that introduces pressurized steam into the pressure vessel while the pressure vessel is loaded with the product to be peeled for a steam treatment of the product; and
a rotating device that rotates the pressure vessel about the axis of rotation of the pressure vessel,
wherein the pressure vessel includes a plurality of lifters inside the pressure vessel for entraining and lifting the product about the axis of rotation of the pressure vessel during rotation of the pressure vessel, and
wherein each of the lifters protrudes substantially radially inwardly from a region of an interior wall surface of the pressure vessel and is configured to assist lifting and mixing of the product to be peeled to enable steam to access each individual product.

* * * * *